(12) United States Patent
Park et al.

(10) Patent No.: US 10,564,751 B2
(45) Date of Patent: Feb. 18, 2020

(54) ELECTRONIC DEVICE AND INPUT METHOD OF ELECTRONIC DEVICE

(71) Applicant: Samsung Electronics Co., Ltd., Gyeonggi-do (KR)

(72) Inventors: Doo-Yong Park, Gyeongsangbuk-do (KR); Jeong-Wook Seo, Daegu (KR); Young-Gyun Lee, Gyeongsangbuk-do (KR); Young-Dae Lee, Daegu (KR); Jae-Hak Lee, Gyeongsangbuk-do (KR); Min-Ho Kim, Gyeonggi-do (KR); Cheong-Jae Lee, Daegu (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/748,883

(22) PCT Filed: Aug. 11, 2016

(86) PCT No.: PCT/KR2016/008853
§ 371 (c)(1),
(2) Date: Jan. 30, 2018

(87) PCT Pub. No.: WO2017/026821
PCT Pub. Date: Feb. 16, 2017

(65) Prior Publication Data
US 2019/0012027 A1    Jan. 10, 2019

(30) Foreign Application Priority Data
Aug. 13, 2015    (KR) .................. 10-2015-0114340

(51) Int. Cl.
*G06F 3/041* (2006.01)
*G06F 3/0354* (2013.01)
*G06F 3/01* (2006.01)

(52) U.S. Cl.
CPC ............ *G06F 3/0412* (2013.01); *G06F 3/017* (2013.01); *G06F 3/03545* (2013.01)

(58) Field of Classification Search
CPC .... G06F 3/0412; G06F 3/017; G06F 3/03545; G06F 3/044
See application file for complete search history.

(56) References Cited

U.S. PATENT DOCUMENTS 5,488,204 A  *  1/1996  Mead .................... G06F 3/041
                                                          178/18.06
9,182,860 B2 *  11/2015  Takashima ............. G06F 3/044
(Continued)

FOREIGN PATENT DOCUMENTS

JP          3432149         8/2003
JP         2014063225       4/2014
(Continued)

OTHER PUBLICATIONS

PCT/ISA/210 Search Report issued on PCT/KR2016/008853 (pp. 3).
(Continued)

*Primary Examiner* — Premal R Patel
(74) *Attorney, Agent, or Firm* — The Farrell Law Firm, P.C.

(57) ABSTRACT

An electronic device according to various examples comprises: a touch screen display including a touch panel; a processor electrically connected to the display; and a memory electrically connected to the processor, wherein the memory can be set to store instructions that, when executed, enable the processor to: receive, from the touch panel, data related to contact or proximity of an external object to the touch screen display; determine an area detected by the touch panel through the contact or the proximity on the basis of at least a part of the data; determine at least a part of the area having a relatively stronger signal strength in the area;
(Continued)

determine at least another part of the area having a relatively weaker signal strength in the area; and display an image or a change in an image on the display on the basis of positions and/or sizes of the determined areas.

15 Claims, 23 Drawing Sheets

(56) References Cited

U.S. PATENT DOCUMENTS

| | | | | |
|---|---|---|---|---|
| 2002/0085003 | A1* | 7/2002 | Nagashima | G06T 11/001 345/441 |
| 2010/0245286 | A1* | 9/2010 | Parker | G06F 3/0416 345/174 |
| 2011/0291944 | A1* | 12/2011 | Simmons | G06F 3/0416 345/173 |
| 2013/0120281 | A1* | 5/2013 | Harris | G06F 3/04883 345/173 |
| 2013/0135262 | A1* | 5/2013 | Alameh | G06F 3/0383 345/179 |
| 2014/0267078 | A1 | 9/2014 | Kukulski et al. | |
| 2014/0267192 | A1* | 9/2014 | Matsuura | G06F 3/03546 345/179 |
| 2014/0362046 | A1 | 12/2014 | Yoshida | |
| 2015/0169123 | A1* | 6/2015 | Lee | G06F 3/0418 345/174 |
| 2016/0070371 | A1* | 3/2016 | Oonishi | G06F 3/044 345/174 |
| 2016/0299605 | A1* | 10/2016 | Philipp | G06F 3/044 |
| 2017/0262167 | A1* | 9/2017 | Sanders | G06F 3/044 |

FOREIGN PATENT DOCUMENTS

| | | |
|---|---|---|
| KR | 1020060084945 | 7/2006 |
| KR | 1020140104228 | 8/2014 |
| KR | 1020150050288 | 5/2015 |
| WO | WO 2013013225 | 1/2013 |

OTHER PUBLICATIONS

PCT/ISA/237 Written Opinion issued on PCT/KR2016/008853 (pp. 8).
European Search Report dated Jun. 29, 2018 issued in counterpart application No. 16835461.1-1216, 7 pages.

* cited by examiner

ELECTRONIC DEVICE AND INPUT METHOD OF ELECTRONIC DEVICE

PRIORITY

This application is a National Phase Entry of International Application No. PCT/KR2016/008853, filed on Aug. 11, 2016, and claims priority to Korean Patent Application No. 10-2015-0114340, filed Aug. 13, 2015, the content of each of which is incorporated herein by reference.

TECHNICAL FIELD

Various embodiments relate to an electronic device and an input method of an electronic device.

BACKGROUND ART

With the wide use of smartphones, technology for interfacing between users and electronic devices, that is, technology enabling an electronic device to recognize a variety of kinds of user input and to provide various kinds of output depending on recognized results, is becoming gradually advanced.

In particular, using an input device, such as a stylus pen, on a user input interface, such as a touch panel, enables users to provide intuitive input to electronic devices as if writing on a notebook.

For example, a stylus pen, which is currently used, may be employed to provide various drawing input to an electronic device, in which the electronic device may output a drawing display on a display panel corresponding to a drawing input.

DETAILED DESCRIPTION OF THE INVENTION

Technical Problem

An electronic device may be provided with a stylus pen or a stylus brush as an input device of the electronic device by the manufacturer of the electronic device. Since the stylus brush has the same apparent shape as a general brush, using the stylus brush as an input device of an electronic device enables a user to feel as if she/he were performing drawing input into the electronic device using an actual brush. However, the stylus brush resembles a general brush only from the aspects of shape and appearance, and performs input operation in the same manner as a stylus pen.

Therefore, using an input device, such as the stylus brush, provides only intuitive drawing input but is only limitedly able to realize the feeling of actual writing, such as a feeling of drawing with writing materials including a brush, in an electronic device.

Various embodiments of the present disclosure may provide an electronic device and an input method of an electronic device capable of providing drawing output corresponding to an input device, which is similar to that from an actual writing material, depending on the type of the input device that touches or approaches the electronic device.

Technical Solution

According to various embodiments, an electronic device may include: a touch screen display configured to comprise a touch panel; a processor configured to be electrically connected to the display; and a memory configured to be electrically connected to the processor, wherein the memory may be configured to store instructions that, when executed, enable the processor to: receive, from the touch panel, data about touch or proximity of an external object on or to the touch screen display; determine an area detected due to the touch or proximity relative to the touch panel based at least partially on the data; determine a first sub-area having relatively high signal strength in the area; determine a second sub-area having relatively low signal strength in the area; and display an image or a change in an image on the display based on positions and/or sizes of the determined sub-areas.

According to various embodiments, an input method of an electronic device may include: receiving data about touch or proximity of an external object on or to the touch screen display from the touch panel; determining an area detected due to the touch or proximity relative to the touch panel based at least partially on the data; determining a first sub-area having relatively high signal strength in the area; determining a second sub-area having relatively low signal strength in the area; and displaying an image or a change in an image on the display based on positions and/or sizes of the determined sub-areas.

According to various embodiments, an electronic device may include: a touch screen display configured to comprise a touch panel; a processor configured to be electrically connected to the display; and a memory configured to be electrically connected to the processor, wherein the memory may be configured to store instructions that, when executed, enable the processor to: receive, from the touch panel, data about touch or proximity of an external object on or to the touch screen display; determine an area detected due to the touch or proximity relative to the touch panel based at least partially on the data; determine at least a portion having a relatively high signal strength in the area; determine at least another portion having a relatively low signal strength in the area; and select an object based on a position of any one of the at least a portion and the at least another portion.

Advantageous Effects

An electronic device and an input method of an electronic device according to various embodiments may provide a drawing output corresponding to an input device, which is similar to that from an actual writing material, depending on the type of the input device that touches or approaches the electronic device, thereby providing user convenience.

MODE FOR CARRYING OUT THE INVENTION

Figure 1:
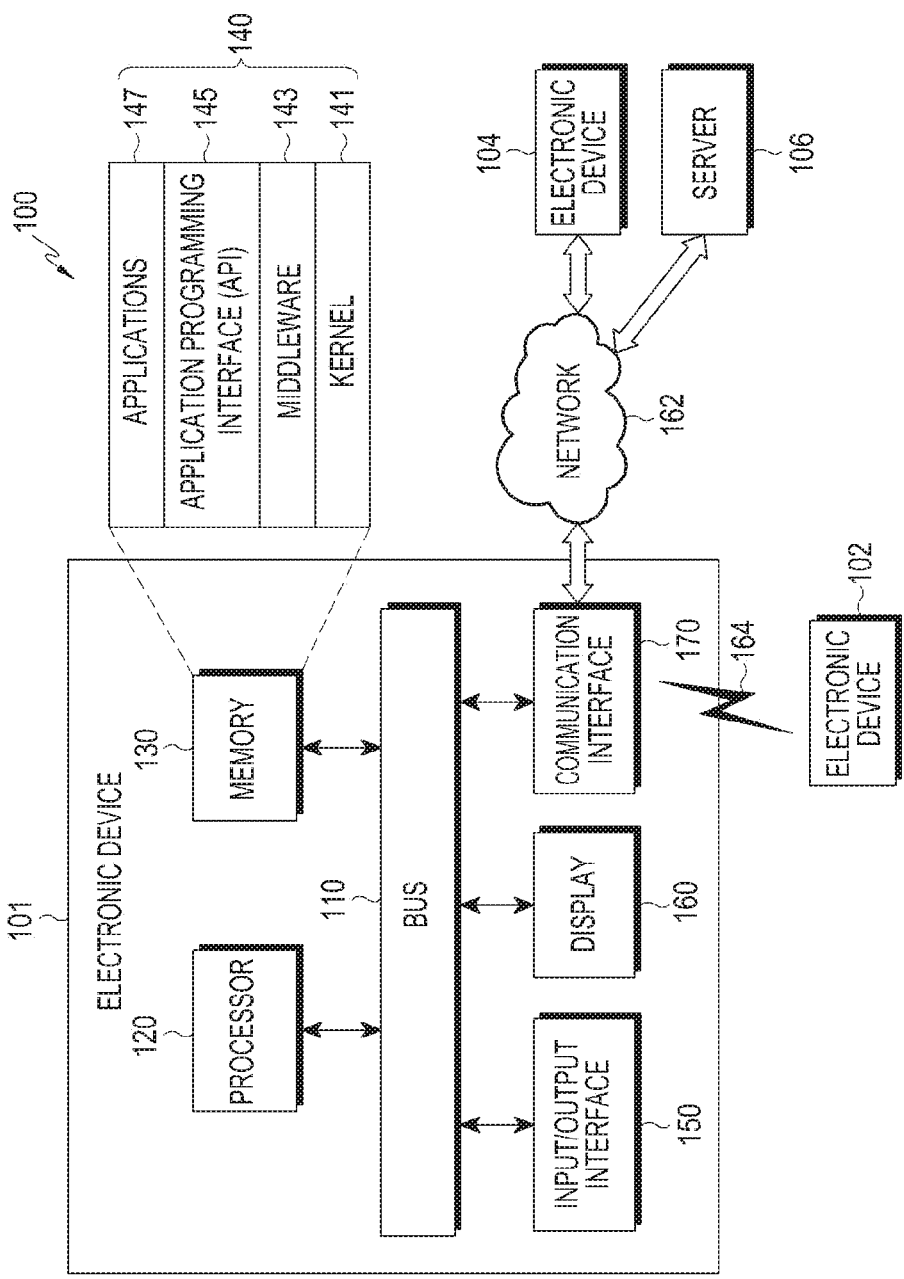
FIG. 1 illustrates a network environment according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates an electronic device 101 in a network environment 100 according to various embodiments. The electronic device 101 may include a bus 110, a processor 120, a memory 130, an input/output interface 150, a display 160, and a communication interface 170. In some embodiments, at least one of the components may be omitted, or additional components may be further included in the electronic device 101.

The bus 110 may include, for example, a circuit that connects the components 110 to 170 to each other and delivers communications (for example, control messages and/or data) between the components.

The processor 120 may include one or more of a Central Processing Unit (CPU), an Application Processor (AP), and a Communication Processor (CP). The processor 120 may control, for example, at least one different component of the electronic device 101, and/or may perform an operation relating to communication or data processing.

The memory 130 may include a volatile and/or nonvolatile memory. The memory 130 may store, for example, a command or data related to at least one different component of the electronic device 101. According to one embodiment, the memory 130 may store software and/or a program 140. The program 140 may include, for example, a kernel 141, middleware 143, an Application Programming Interface (API) 145, and/or an application program (or "application") 147. At least part of the kernel 141, the middleware 143, and the API 145 may be designated as an Operating System (OS).

The kernel 141 may control or manage system resources (for example, the bus 110, the processor 120, the memory 130, or the like) used to perform an operation or function implemented in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data.

Further, the middleware 143 may process one or more requests for operations received from the application 147 according to the priority thereof. For example, the middleware 143 may assign at least one application 147 a priority for using a system resource (for example, the bus 110, the processor 120, the memory 130, or the like) of the electronic device 101. For example, the middleware 143 may process the one or more requests for operations according to the priority assigned to the at least one application, thereby performing scheduling or load balancing for the one or more requests for operations.

The API 145 is, for example, an interface for the application 147 to control a function provided from the kernel 141 or the middleware 143, and may include, for example, at least one interface or function (for example, a command) for file control, window control, image processing, or text control.

The input/output interface 150 may serve as an interface that delivers a command or data, which is input from, for example, a user or a different external device, to a different component(s) of the electronic device 101. Further, the input/output interface 150 may output a command or data, which is received from a different component(s) of the electronic device 101, to the user or to the different external device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (for example, text, an image, a video, an icon, a symbol, or the like) for the user. The display 160 may include a touch screen and may receive touch, gesture, proximity, or hovering input using, for example, an electronic pen or a body part of a user.

The communication interface 170 may establish communication, for example, between the electronic device 101 and an external device (for example, a first external electronic device 102, a second external electronic device 104, or a server 106). For example, the communication interface 170 may be connected to a network 162 via wireless communication or wire-based communication to communicate with the external device (for example, the second external electronic device 104 or the server 106).

The wireless communication may use, for example, a cellular communication protocol, which may be, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). Further, the wireless communication may include, for example, short-range communication 164. The short-range communication 164 may include, for example, at least one of Wireless Fidelity (Wi-Fi), Bluetooth, Near-Field Communication (NFC), and Global Navigation Satellite System (GNSS). The GNSS may include, for example, at least one of a Global Positioning System (GPS), a Global Navigation Satellite System (i), a BeiDou Navigation Satellite System (hereinafter, "BeiDou"), and Galileo, which is the European global satellite-based navigation system, depending on a use area or bandwidth. In the present document, "GPS" may be interchangeably used with "GNSS" hereinafter. The wire-based communication may include, for example, at least one of Universal Serial Bus (USB), High-Definition Multimedia Interface (HDMI), Recommended Standard 232 (RS-232), and Plain Old Telephone Service (POTS). The network 162 may include a telecommunications network, which may be, for example, at least one of a computer network (for example, a Local Area Network (LAN) or Wide Area Network (WAN)), the Internet, and a telephone network.

The first and second external electronic devices 102 and 104 may each be a device of a type that is the same as, or different from, that of the electronic device 101. According to one embodiment, the server 106 may include a group of one or more servers. According to various embodiments, all or some of the operations performed in the electronic device 101 may be performed in another electronic device or a plurality of electronic devices (for example, the electronic devices 102 and 104 or the server 106). According to one embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the same received result or by additionally processing the result. To this end, cloud-computing, distributed-computing, or client-server-computing technologies may be used.

Figure 2:
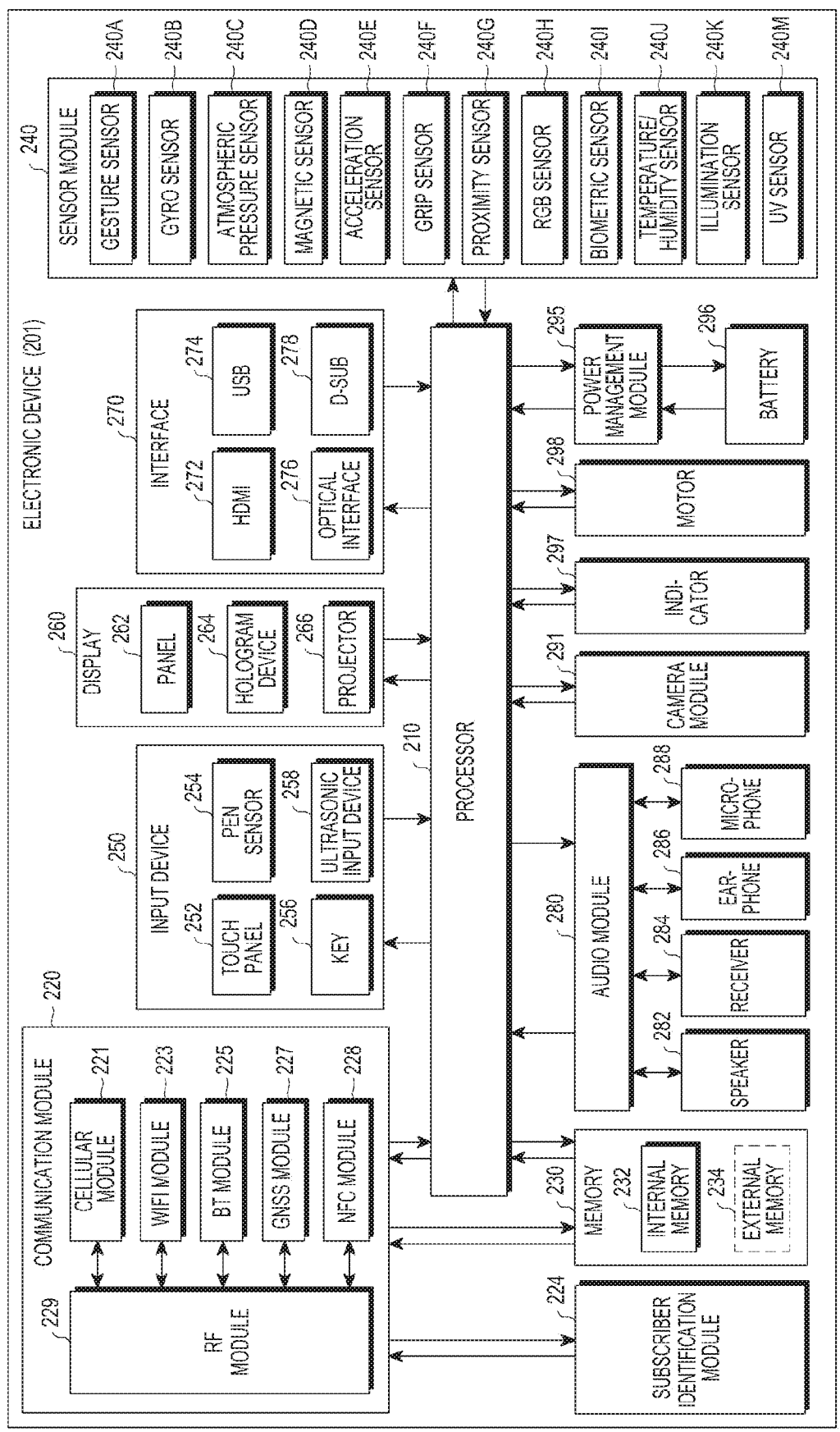
FIG. 2 is a block diagram of an electronic device according to various embodiments.

FIG. 2 is a block diagram of an electronic device 201 according to various embodiments. The electronic device 201 may include, for example, all or part of the electronic device 101 illustrated in FIG. 1. The electronic device 201 may include one or more processors (for example, Application Processors (APs)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processors 210 may run, for example, an operating system or an application to control a plurality of hardware or software components that are connected to the processors 210, and may perform various kinds of data processing and operations. The processors 210 may be configured, for example, as a System on Chip (SoC). According to one embodiment, the processors 210 may further include a Graphic Processing Unit (GPU) and/or an image signal processor. The processors 210 may include at least part (for example, a cellular module 221) of the components illustrated in FIG. 2. The processors 210 may load a command or data received from at least one of other components (for example, nonvolatile memory) into volatile memory to process the command or data, and may store various types of data in the nonvolatile memory.

The communication module 220 may have a configuration that is the same as, or similar to, that of the communication interface 170 in FIG. 1. The communication module 220 may include, for example, a cellular module 221, a Wi-Fi module 223, a Bluetooth module 225, a global navigation satellite system (GNSS) module 227 (for example, a global positioning system (GPS) module, a GLONASS module, a BeiDou module, or a Galileo module), a Near-Field Communication (NFC) module 228, and a radio frequency (RF) module 229.

The cellular module 221 may provide, for example, a voice call, a video call, a text messaging service, or an Internet service through a communication network. According to one embodiment, the cellular module 221 may perform identification and authentication of the electronic device 201 in a communication network using a Subscriber Identity Module (SIM, for example, a SIM card) 224. According to one embodiment, the cellular module 221 may perform at least some of the functions provided by the processors 210. According to one embodiment, the cellular module 221 may include a Communication Processor (CP).

The Wi-Fi module 223, the Bluetooth module 225, the GNSS module 227, and the NFC module 228 may each include a processor to process data transmitted and received via the respective modules. According to one embodiment, at least some (for example, two or more) of the cellular module 221, the Wi-Fi module 223, the Bluetooth module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a Power Amplifier (amp) Module (PAM), a frequency filter, a Low-Noise Amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including a SIM and/or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable And Programmable ROM (EPROM), an Electrically Erasable and a Programmable ROM (EEPROM), a mask ROM, a flash ROM, a flash memory (for example, an NAND flash, an NOR flash, or the like), a hard drive, or a Solid-State Drive (SSD)).

The external memory 234 may further include a flash drive, for example, a Compact Flash (CF), a Secure Digital (SD), a micro Secure Digital (micro-SD), a mini Secure Digital (mini-SD), an extreme digital (xD), a Multi-Media Card (MMC), a memory stick, or the like. The external memory 234 may be functionally and/or physically connected to the electronic device 201 through various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258. The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or may include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, a display 160) may include a panel 262, a hologram device 264, or a projector 266. The panel 262 may include a configuration that is the same as, or similar to, that of the display 160 of FIG. 1. The panel 262 may be configured, for example, to be flexible, transparent, or wearable. The panel 262 may be formed with the touch panel 252 in a single module. The hologram device 264 may display a three-dimensional image in the air using light interference. The projector 266 may project light onto a screen to display an image. The screen may be disposed, for example, inside or outside the electronic device 201. According to one embodiment, the display 260 may further include a control circuit to control the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a Mobile High-Definition Link (MHL) interface, a Secure Digital (SD) card/Multi-Media Card (MMC) interface, or an Infrared Data Association (IrDA) interface.

The audio module 280 may bidirectionally convert, for example, a sound and an electrical signal. At least some components of the audio module 280 may be included, for example, in the input/output interface 145 illustrated in FIG. 1. The audio module 280 may process sound information input or output, for example, through a speaker 282, a receiver 284, earphones 286, or the microphone 288.

The camera module 291 is a device that takes, for example, a still image and a video. According to one embodiment, the camera module 291 may include one or more image sensors (for example, a front sensor or a rear sensor), a lens, an Image Signal Processor (ISP), or a flash (for example, an LED, a xenon lamp, or the like).

The power management module 295 may manage, for example, the power of the electronic device 201. According to one embodiment, the power management module 295 may include a Power Management Integrated Circuit (PMIC), a charger Integrated Circuit (IC), or a battery or fuel gauge. The PMIC may have wire-based and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. Although not shown, the electronic device 201 may include a processing device for supporting a mobile TV (for example, a GPU). The processing device for supporting the mobile TV may process media data in accordance with Digital Multimedia Broadcasting (DMB), Digital Video Broadcasting (DVB), or mediaFlo™ standards.

Each element mentioned in the present document may include one or more components, and may be designated by different terms depending on the type of the electronic device. In various embodiments, an electronic device may be configured such that at least one of the elements mentioned in the present document is included, some elements are omitted, or additional elements are further included. Further, some of the elements of an electronic device according to various embodiments may be combined into one entity and may perform the same functions as those of the corresponding elements before the combination thereof.

Figure 3:
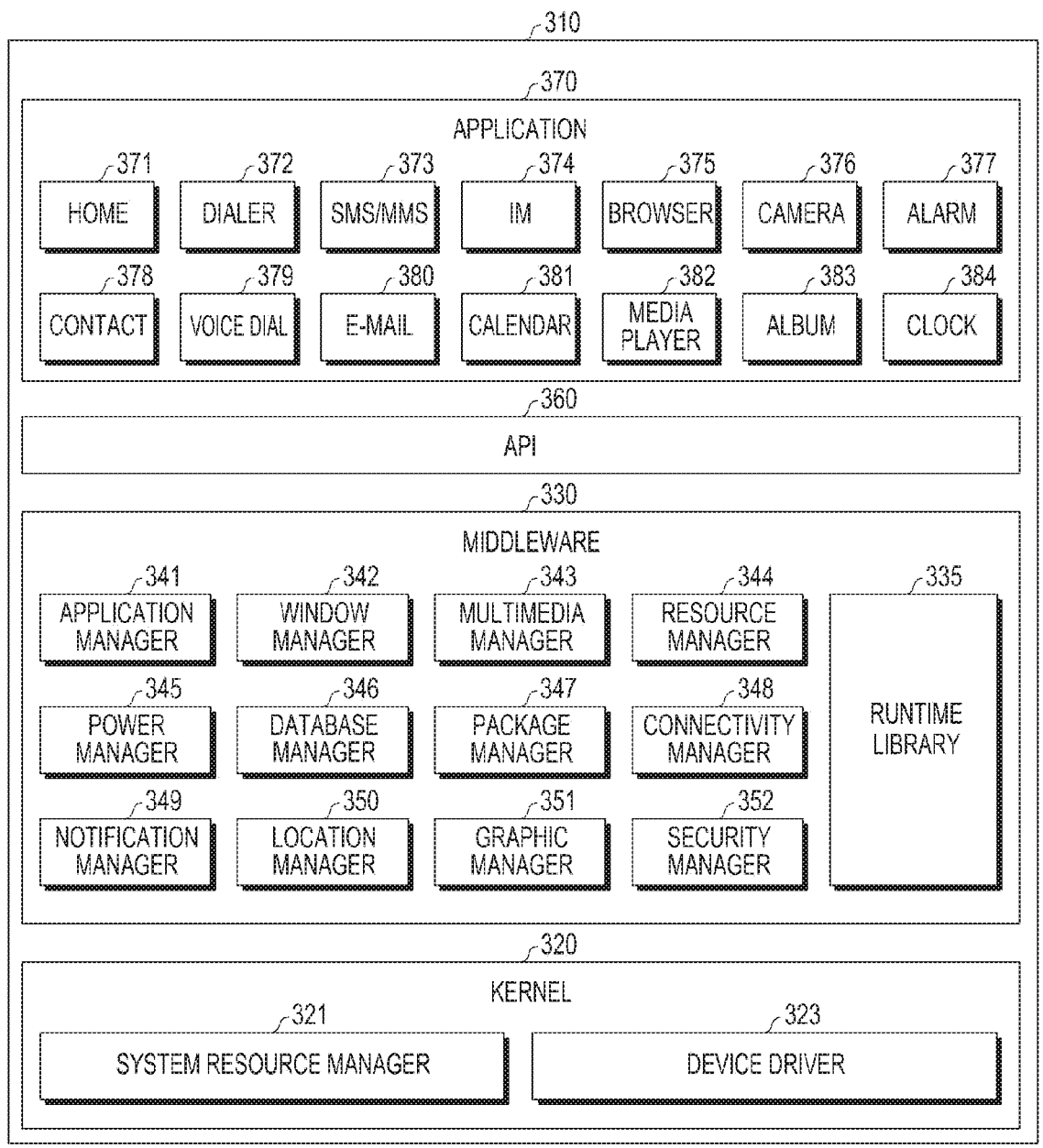
FIG. 3 is a block diagram of a program module according to various embodiments.

FIG. 3 is a block diagram of a program module according to various embodiments. According to one embodiment, the program module 310 (for example, the program 140) may include an Operating System (OS) that controls resources related to an electronic device (for example, the electronic device 101) and/or various applications (for example, the application 147) that run on the OS. The OS may be, for example, Android, iOS, Windows, Symbian, Tizen, Bada, or the like.

The program module 310 may include a kernel 320, middleware 330, an API 360, and/or an application 370. At least part of the program module 310 may be preloaded onto the electronic device, or may be downloaded from an external electronic device (for example, the electronic device 102 or 104, the server 106, or the like).

The kernel 320 (for example, the kernel 141) may include, for example, a system resource manager 321 and/or a device driver 323. The system resource manager 321 may perform control, allocation, or recovery of system resources. According to one embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, functions commonly needed for applications 370, or may provide the applications 370 with various functions through the API 360 so that the applications 370 may efficiently use the limited systems resources in the electronic device. According to one embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 355 may include, for example, a library module used by a complier to add a new function through a programming language while the application 370 is running. The runtime library 355 may perform functions for input/output management, memory management, or mathematical calculations.

The application manager 341 may manage, for example, the life cycle of at least one application among the applications 370. The window manager 342 may manage graphic user interface (GUI) resources used for a screen. The multimedia manager 343 may identify formats that are necessary to play various media files, and may encode or decode a media file using a codec suitable for a corresponding format. The resource manager 344 may manage resources, such as a source code, a memory, or a storage space, for at least one application among the applications 370.

The power manager 345 may operate with, for example, a basic input/output system (BIOS) to manage a battery or power supply and may provide information on power necessary for operation of the electronic device. The database manager 346 may generate, retrieve, or change a database to be used for at least one application among the applications 370. The package manager 347 may install or update an application distributed in the form of a package file.

The connectivity manager 348 may manage wireless connectivity, for example, via Wi-Fi or Bluetooth. The notification manager 349 may display or report an incoming message, an appointment, and an event including a proximity notification in a manner that does not disturb a user. The location manager 350 may manage location information on the electronic device. The graphic manager 351 may manage a graphic effect to be provided for the user or a user interface related to the graphic effect. The security manager 352 may provide overall security functions necessary for system security or user authentication. According to one embodiment, when the electronic device (for example, the electronic device 101) has phone features, the middleware 330 may further include a telephony manager to manage a voice or video call function of the electronic device.

The middleware 330 may include a middleware module that forms combinations of various functions of the foregoing components. The middleware 330 may provide a specialized module for each type of OS in order to provide differentiated functions. Further, the middleware 330 may dynamically delete some of the existing components or add new components.

The API 360 (for example, the API 145) is, for example, a set of API programming functions, and may be provided with a different configuration depending on the OS. For example, one API set for each platform may be provided in the case of Android or iOS, while two or more API sets for each platform may be provided in the case of Tizen.

The application 370 (for example, the application 147) may include one or more applications that are capable of performing functions of, for example, a home screen 371, a dialer 372, SMS/MMS 373, instant messaging (IM) 374, a browser 375, a camera 376, an alarm 377, an address book 378, a voice dialer 379, email 380, a calendar 381, a media player 382, an album 383, a clock 384, or health care (for example, for measuring exercising or blood sugar), an environmental data application (for example, for providing atmospheric pressure, humidity, or temperature data), or the like.

According to one embodiment, the application 370 may include an application (hereinafter, "information exchange application" for convenience of description) that supports information exchange between the electronic device (for example, the electronic device 101) and an external electronic device (for example, the electronic device 102 or 104). The information exchange application may include, for example, a notification relay application for relaying specific information to the external electronic device or a device management application for managing the external electronic device.

For example, the notification relay application may include a function of relaying notification information, which is generated in another application (for example, the SMS/MMS application, the email application, the health care application, the environmental data application, or the like) of the electronic device, to the external electronic device (for example, the electronic device 102 or 104).

Additionally, the notification relay application may receive notification information, for example, from the external electronic device and may provide the notification information to the user.

The device management application may manage (for example, install, delete, or update), for example, at least one function (for example, a function of turning on/turning off the external electronic device itself (or some components) or adjusting the brightness (or resolution) of a display) of the external electronic device (for example, the electronic device 102 or 104) communicating with the electronic device, an application operating in the external electronic device, or a service (for example, a call service or message service) provided by the external electronic device.

According to one embodiment, the application 370 may include an application (for example, a health care application of a mobile medical device) assigned according to the attributes of the external electronic device (for example, the electronic device 102 or 104). According to one embodiment, the application 370 may include an application received from the external electronic device (for example, the server 106 or the electronic device 102 or 104). According to one embodiment, the application 370 may include a third-party application that may be downloaded from a preloaded application or the server. The illustrated components of the program module 310, according to the embodiments, may be termed differently depending on the OS.

According to various embodiments, at least part of the program module 310 may be implemented in software, firmware, hardware, or combinations of at least two or more. At least part of the program module 310 may be implemented (for example, run) by, for example, a processor (for example, the processor 210). At least part of the program module 310 may include, for example, a module, a program, a routine, sets of instructions, or a process to perform one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

According to various embodiment, a storage medium stores instructions, wherein the instructions are configured for at least one processor to perform at least one operation when executed by the at least one processor, the at least one operation recording a program to perform: receiving, by an electronic device, data about touch or proximity of an external object on or to a touch screen display from a touch panel of the display; determining an area detected due to the touch or proximity relative to the touch panel at least partially on the basis of the data; determining at least a portion having a relatively high signal strength in the area; determining at least another portion having a relatively low signal strength in the area; and displaying an image or a change in an image on the display on the basis of the positions and/or sizes of the determined areas.

Figure 4:
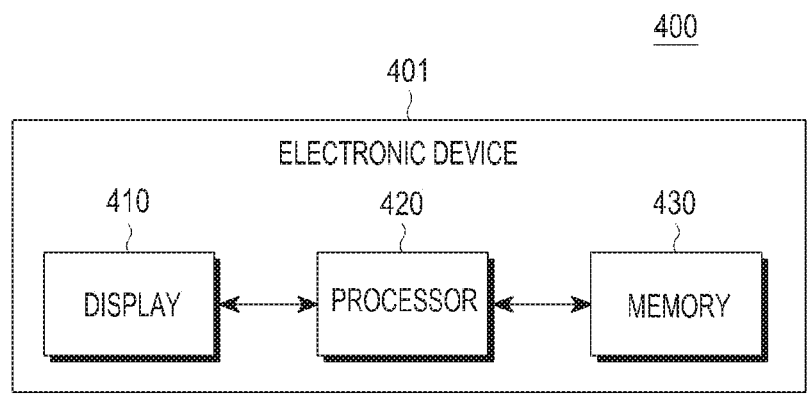
FIG. 4 is a block diagram illustrating an electronic device according to various embodiments.

FIG. 4 is a block diagram 400 illustrating an electronic device according to various embodiments. The electronic device 401 may be, for example, the electronic device 101 illustrated in FIG. 1. Referring to FIG. 4, the electronic device 401 may include a display 410, a processor 420, and a memory 430.

According to various embodiments, the display 410 may be, for example, the display 160 illustrated in FIG. 1. The display 410 may be a touch screen display, and the touch screen display may include a touch panel capable of recognizing a touch operation using an external object, such as an input device or a body part of a user.

Figure 5:
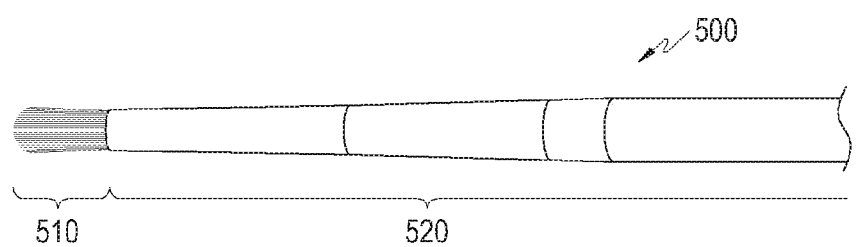
FIG. 5 shows an illustrative configuration of a stylus brush.

The input device may include a stylus brush, and FIG. 5 shows an illustrative configuration of a stylus brush. Referring to FIG. 5, the stylus brush 500 includes a contact portion 510 and a body portion 520, the contact portion 510 including a plurality of elastic fibers and having unique conductivity. The contact portion 510 induces an electromagnetic field when coming in contact with or approaching the touch panel, and may include a conductive material other than carbon fiber.

Figure 6:
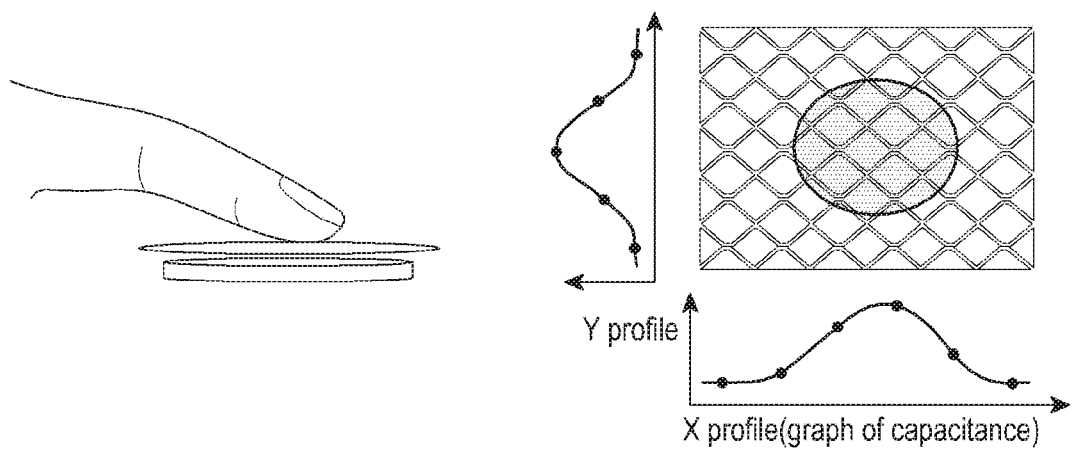
FIG. 6 shows an illustrative configuration of the touch panel.
Figure 6:
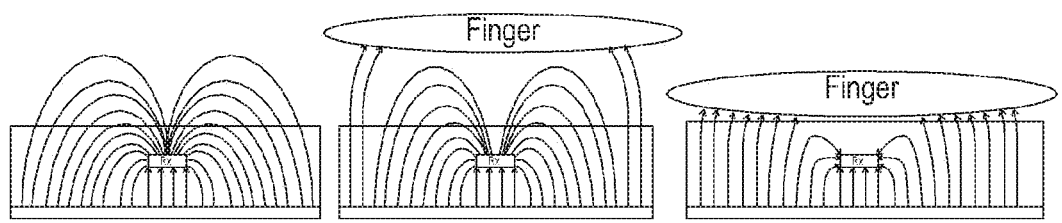

The touch panel is an electronic device capable of touch recognition, and FIG. 6 shows the illustrative configuration of the touch panel. As shown in FIG. 6, the touch panel has a two-dimensional plane defined by an X profile and a Y profile, and employs a sensing mode using capacitance coupling with an AC voltage applied, in which user input using the input device or the body part of the user may be detected using a change in capacitance by detecting a touched area of a certain size or greater.

According to various embodiments, the display 410 may detect data about the input (touch or proximity) with the input device of the body part of the user and may provide the detected data to the processor 420.

According to one embodiment, when the input (touch or proximity) with the input device is recognized, the touch panel of the display 410 may detect the signal strength, the size (width and height), and the coordinates of an area in which the input with the stylus brush occurs and may provide the detected signal strength, size, and coordinates to the processor 420. The operation of detecting the data (signal strength, size, and coordinates) about the input with the input device is described below with reference to FIG. 7.

Figure 7:
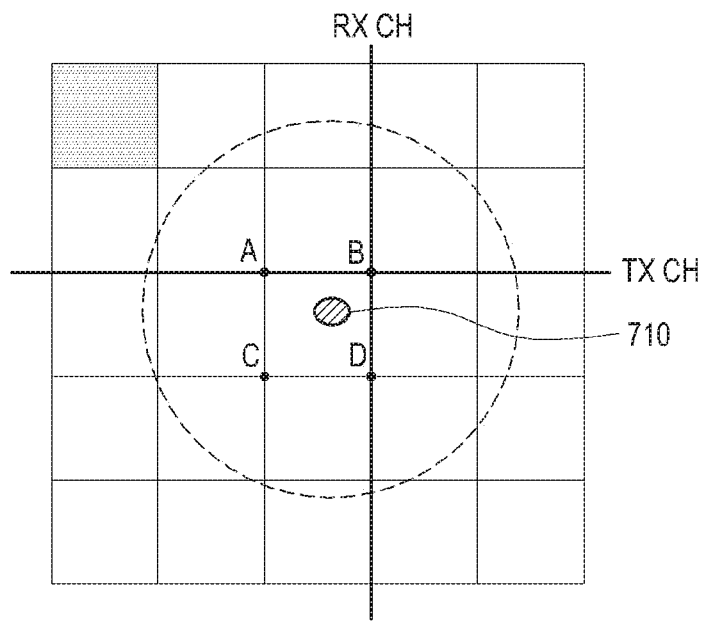
FIG. 7 illustrates the detection of data about input with an input device in a display of an electronic device according to various embodiments.

FIG. 7 illustrates the detection of data about input with an input device in a display of an electronic device according to various embodiments. Referring to FIG. 7, when the input (touch or proximity) through the input device is recognized in a specific area 701 of the display, the touch panel may obtain raw data by identifying sensor information at intersections A, B, C, and D of Tx and Rx, may detect a signal strength and a size (width and height) relating to the input (touch or proximity) with the input device by combing the obtained raw data, and may provide the signal strength and size (width and height) to the processor 420.

According to various embodiments, the processor 420 may be the processor 120 illustrated in FIG. 1. The processor 410 may include, for example, one of hardware, software, and firmware, or a combination of at least two thereof.

According to various embodiments, the processor 420 may determine the type of the input device using data about the input (touch or proximity) through the input device, which performs input into (touches or approaches) the display 410.

According to one embodiment, the processor 420 may detect the type of the input device from the memory 430 using at least one of a signal strength value and a size (width and height) value received from the display 410. Information on the type of input device based on signal strength and size is predefined and stored in the memory 430. The processor 420 may determine that the input device is a stylus brush using the signal strength and size received from the display 410 based on the information previously stored in the memory 430.

Figure 8:
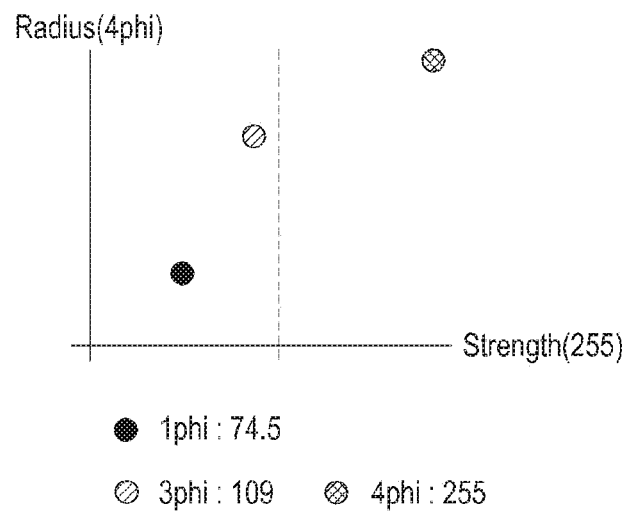
FIG. 8 illustrates an operation of detecting the type of input device using material characteristics of the input device in an electronic device according to various embodiments.
Figure 8:
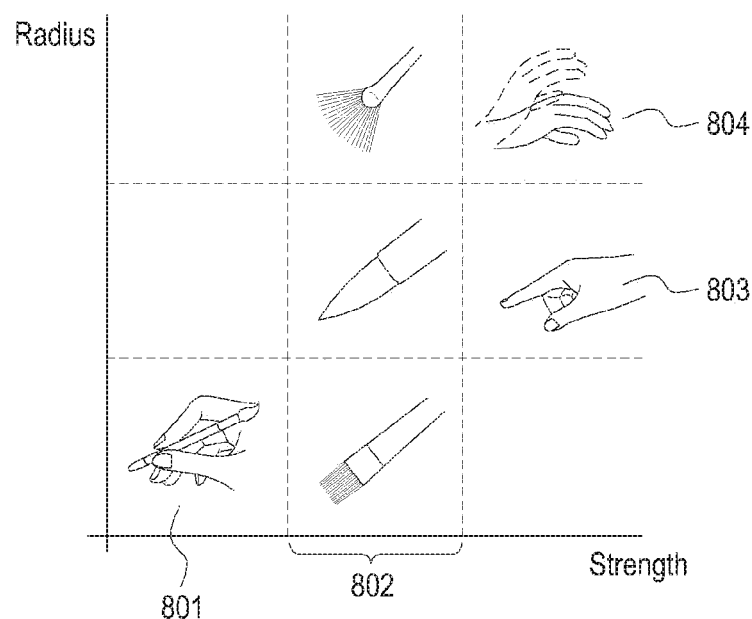

The operation of detecting the type of the input device from the memory 430 may be described below with reference to FIG. 8. FIG. 8 illustrates an operation of detecting the type of input device using material characteristics of the input device in an electronic device according to various embodiments. The input device has unique signal strength and a different contact size depending on the type thereof, and can be distinguished by the contact size and the signal strength. For example, a stylus pen has a size of 1π and a signal strength of 74.5. As illustrated in FIG. 8, an area on a two-dimensional plane may be distinguished by a size (radius) and strength, an input device that satisfies both signal strength and a size in each area is defined in advance, and information on the type of input device defined in each area may be stored in the memory 430. For example, the input device predefined in each area may include a stylus pen input 801, an input 802 based on the type of a stylus brush, a user finger-touch input 803, and a palm-touch input 804.

According to one embodiment, the processor 420 may detect the types of input devices having similar patterns by identifying the form, size, and travelling path of an input device, which are recognized during the use of the input device.

The processor 420 may detect the form and travelling path of the input device using at least one of the coordinates, the signal strength, and the size (width and height) received from the display 410 during the use of the input device.

The operation of detecting the form of the input device may be described with reference to FIGS. 9A to 9C.

Figure 9A:
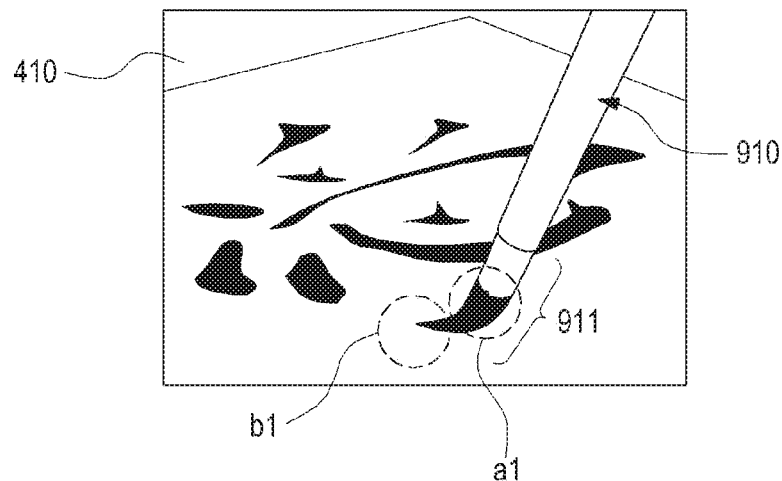
FIGS. 9A to 9C illustrate an operation of detecting the form of an input device in an electronic device according to various embodiments.
Figure 9B:
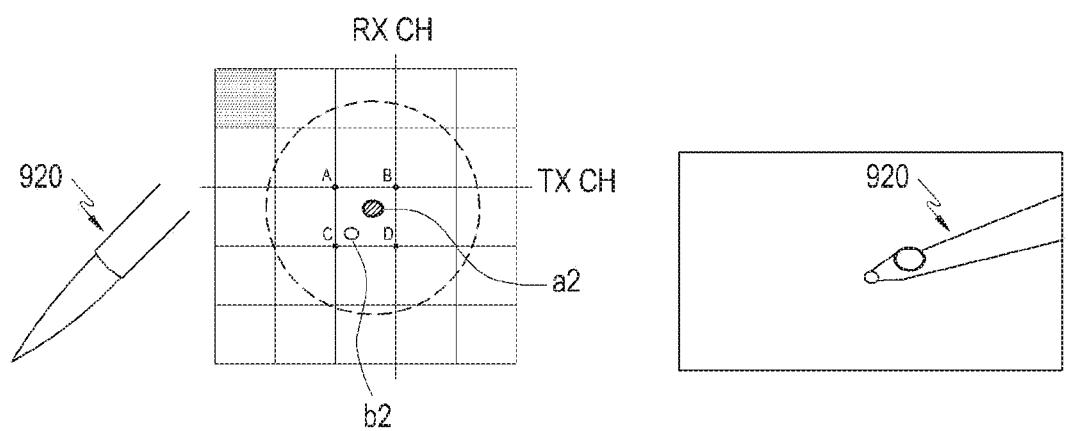
Figure 9C:
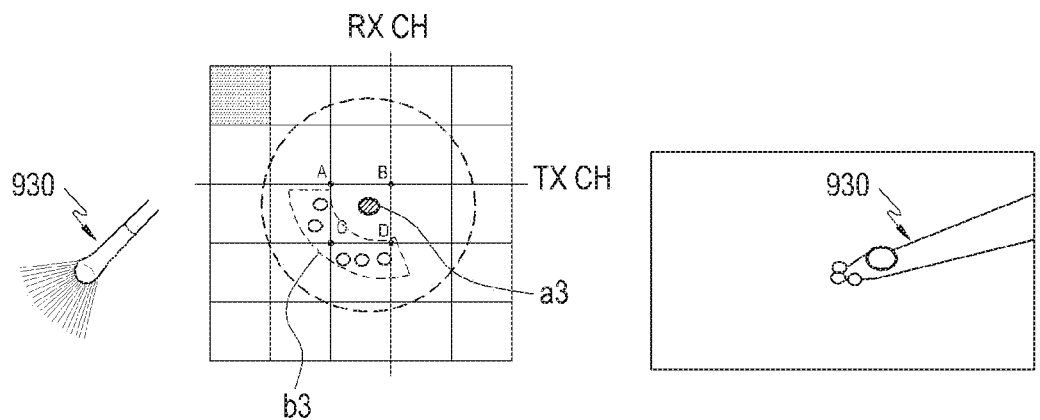

FIGS. 9A to 9C illustrates an operation of detecting the form of an input device in an electronic device according to various embodiments. As illustrated in FIG. 9A, while a stylus brush 910 is in contact with the display 410, the form, size, and end portion of a contact portion 911 of the brush may be identified based on the signal strength and the size of the contact portion 911 of the stylus brush 910 that is in contact with the display 410. In the brush 910, depending on the user input, a center point a1 of the contact portion 911 of the brush has a large contact size and high signal strength and an end point b1 has a small contact size and low signal strength. The processor 420 may determine the type of the stylus brush based on the form of the stylus brush. As illustrated in FIG. 9B, when a center point a2 and an end point b2 are detected based on the coordinates, signal strength, and size received from the display 410, the processor 420 may determine that a first stylus brush 920 has been brought into contact with the display 410. As illustrated in FIG. 9C, when a center point a3 and a plurality of end points b3 are detected based on the coordinates, signal strength, and size received from the display 410, the processor 420 may determine that a second stylus brush 930 has been brought into contact with the display 410.

The operation of detecting the travelling path of the input device may be described with reference to FIGS. 10A to 10D.

Figure 10A:
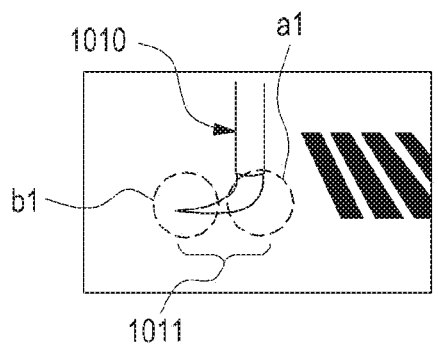
FIGS. 10A to 10D illustrate an operation of detecting the travelling direction of an input device in an electronic device according to various embodiments.
Figure 10B:
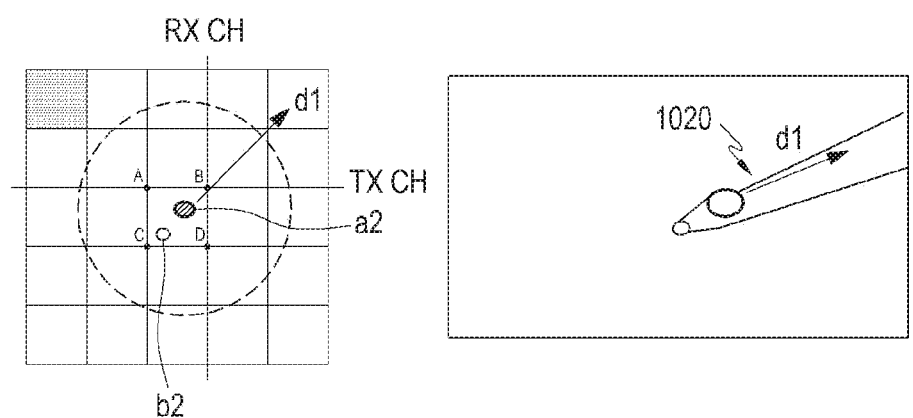
Figure 10C:
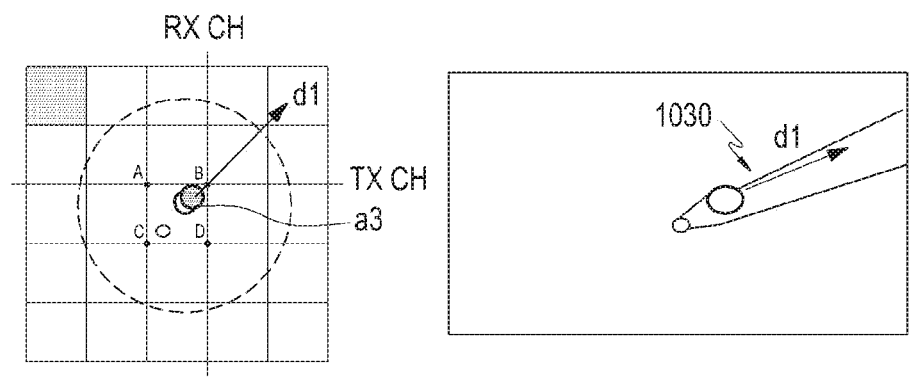
Figure 10D:
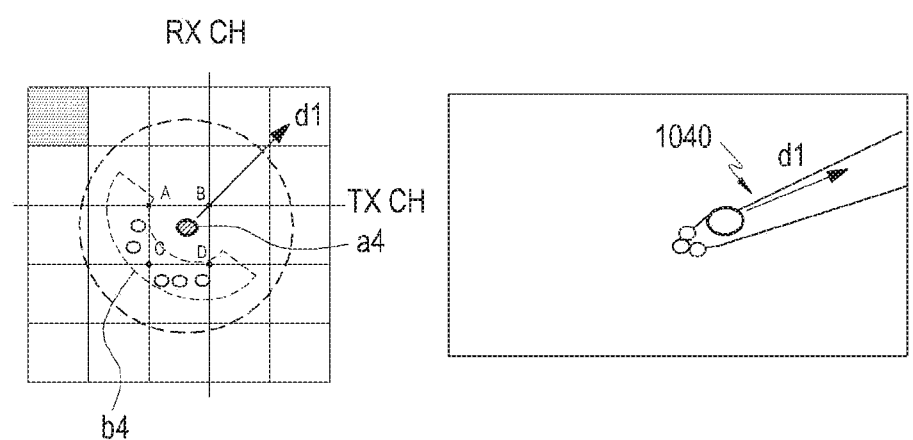

FIGS. 10A to 10D illustrate an operation of detecting the travelling direction of an input device in an electronic device according to various embodiments. As illustrated in FIG. 10A, while a stylus brush 1010 is in contact with the display 410, the travelling direction of the brush 1010 may be predicted based on the signal strength, the size, and the distribution form of a contact portion 10111 of the stylus brush 1010 that is in contact with the display 410. The travelling direction of the brush 1010 may be predicted based on the positions of a center point a1 and an end point b1 of the contact portion 1011 of the brush 1010 and the travelling positions thereof. When the travelling direction of the brush 1010 is predicted, it is also possible to determine a curve input by the brush 1010, to eliminate noise generated when the curve is created, and to provide a guide display service according to the predicted travelling direction. As illustrated in FIG. 10B, the processor 420 may detect a center point a2 and an end point b2 of a contact portion of a brush 1020 based on the coordinates, signal strength, and size received from the display 410, may detect the positions of the detected center point a2 and end point b2, and may predict a direction starting from the end point b2 to the center point a2 as the travelling direction d1 of the brush 1020. As illustrated in FIG. 10C, the processor 420 may detect a center point and an end point of a contact portion of a brush 1030 based on the coordinates, signal strength, and size received from the display 410, and may detect the travelling position of any one of the center point and the end point, for example, the center point a3. The processor 420 may detect a similar pattern corresponding to the detected travelling position of the center point a3 from the memory 430, and may predict the travelling direction d1 of the brush 1030. As illustrated in FIG. 10D, the processor 420 may detect a center point a4 and a plurality of end points d4 of a contact portion of a brush 1040 based on the coordinates, signal strength, and size received from the display 410. The processor 420 may predict the travelling direction d1 of the brush 1040 based on the distribution of the plurality of end points d4 disposed around the center point a4. Alternatively, the processor 420 may predict the travelling direction based on variation in the distribution of the plurality of end points d4 while drawing with the brush 1040. For example, when the user draws with the brush 420 in the horizontal direction and then changes the travelling direction of the brush 420 to the vertical direction, the distribution of the plurality of end points d4 is changed, and thus the travelling direction may be predicted based on variation in the distribution of the plurality of end points d4. In addition, the processor 420 may predict the travelling direction of the brush based only on the form of a contact portion of a stylus brush.

Figure 11:
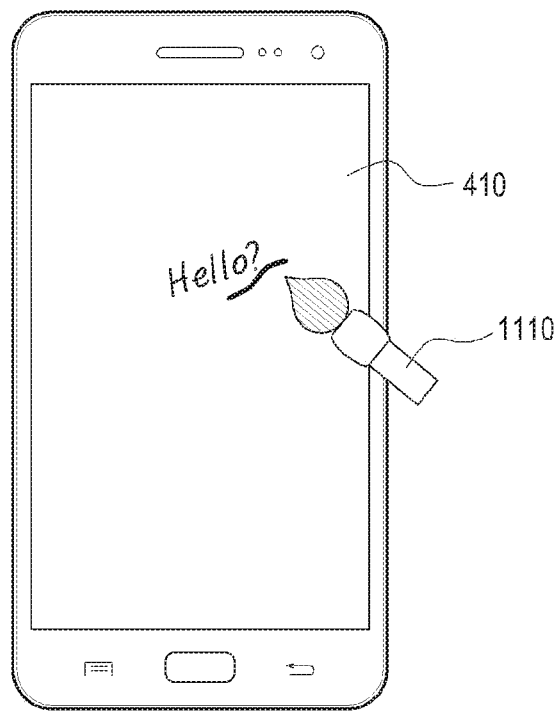
FIG. 11 illustrates an operation of detecting the type of input device while using the input device in an electronic device according to various embodiments.

FIG. 11 illustrates an operation of detecting the type of input device while using the input device in an electronic device according to various embodiments. As illustrated in FIG. 11, while a stylus blush 1110 is being used, the processor 420 may predict the form and the travelling direction of the stylus brush 1110, thus determining that an input device that performs input to the display 410 is the stylus brush 1110.

According to one embodiment, the processor 420 may determine the type of the input device using the signal strength, among the coordinates, the signal strength, and the size received from the display 410. When the signal strength is less than or equal to a first threshold value, the processor 420 may determine that the input device is a stylus pen and may select a first routine. When the signal strength is greater than or equal to a second threshold value, which is greater than the first threshold value, the processor 420 may determine that the input device is a body part of the user, and may select a second routine. When the signal strength is between the first threshold value and the second threshold value, the processor 420 may determine that the input device is a stylus brush, and may select a third routine.

Figure 12:
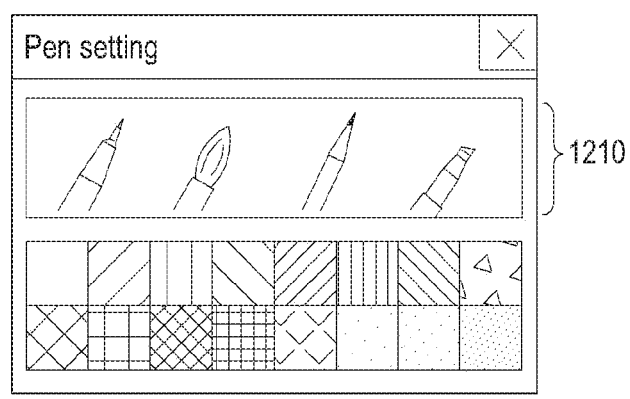
FIG. 12 illustrates an operation of selecting an input device in an electronic device according to various embodiments.

According to one embodiment, the processor 420 may provide a menu for selecting an input device, and may determine the type of input device selected by the user from the menu. FIG. 12 illustrates an operation of selecting an input device in an electronic device according to various embodiments. As illustrated in FIG. 12, the processor 420 may determine the type of input device selected by the user from a menu including types of input devices.

Figure 13:
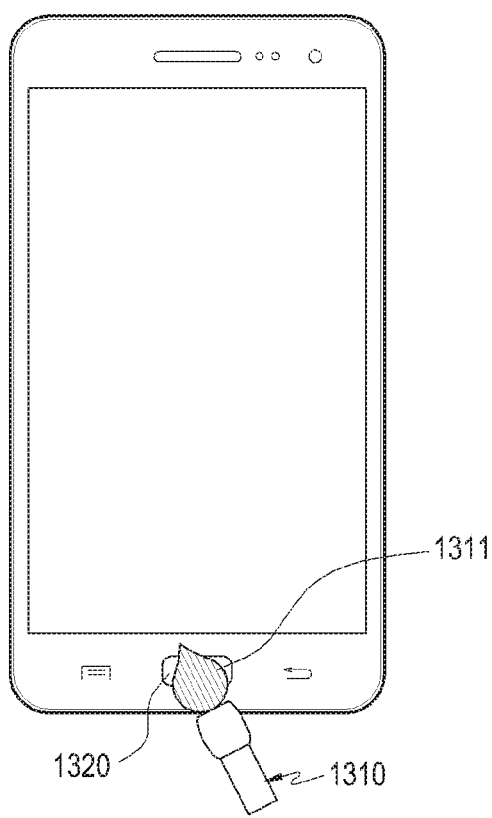
FIG. 13 illustrates an operation of detecting an input device in an electronic device according to various embodiments.

According to one embodiment, the processor 420 may determine the type of input device through a sensor of the electronic device. FIG. 13 illustrates an operation of detecting an input device in an electronic device according to various embodiments. As illustrated in FIG. 13, when a contact portion 1311 of a stylus brush 1310 is detected by a sensor unit 1320 (for example, a precision sensor for fingerprint recognition) included in the electronic device, the processor 420 may detect the form and size of the input device based on sensor information received through the sensor unit 1320, and may determine that the input device is a stylus brush 1310 based on the detected form and size.

According to various embodiments, when a drawing is executed using the stylus brush, the processor 420 may calibrate a start point.

In actual drawing using a brush on a canvas, the drawing starts from the end portion of the brush. However, when a stylus brush is used on the touch screen display including the touch panel, a center point of the brush is recognized as a start point, so that the user may experience a sense of displacement. In order to calibrate such recognition, the processor 420 may determine an end portion of a contact portion of the brush based on the contact size, the strength, and the distribution form (FIGS. 9 and 10) of the contact portion of the stylus brush, and may perform calibration such that a drawing starts from the end portion of the contact portion of the brush. Alternatively, the processor 420 may predict the drawing direction of the moving brush (FIGS. 10A to 10D), and may perform calibration such that a drawing is executed to a certain extent in the opposite direction of the predicted direction of movement of the brush. Further, when the end portion of the contact portion of the brush has a form of diverging to different spots, instead of a general form of converging on one spot, the processor 420 may calibrate a drawing based on dispersed positions.

Figure 14A:
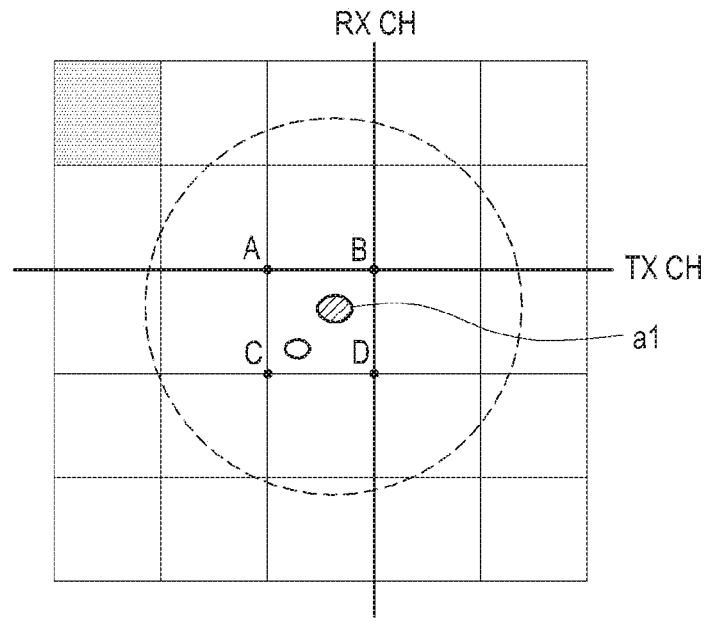
FIGS. 14A to 15B illustrate an operation of calibrating a brush drawing in an electronic device according to various embodiments.
Figure 14B:
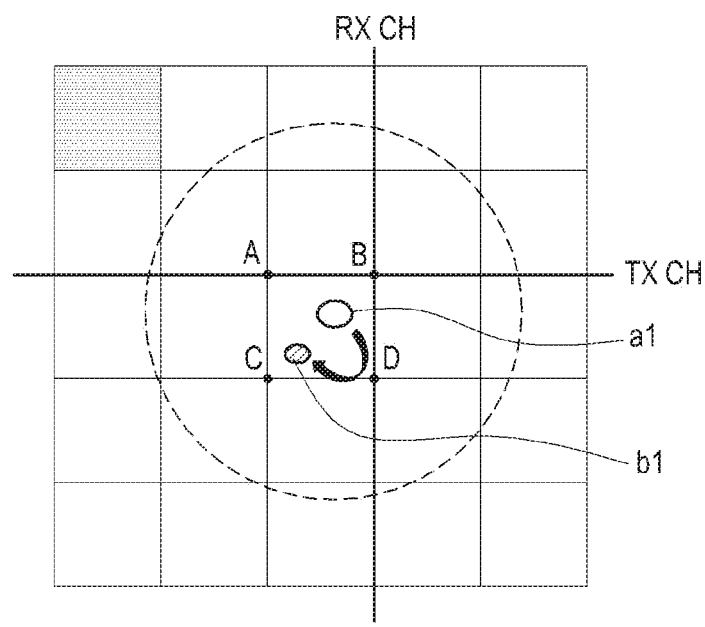
Figure 15A:
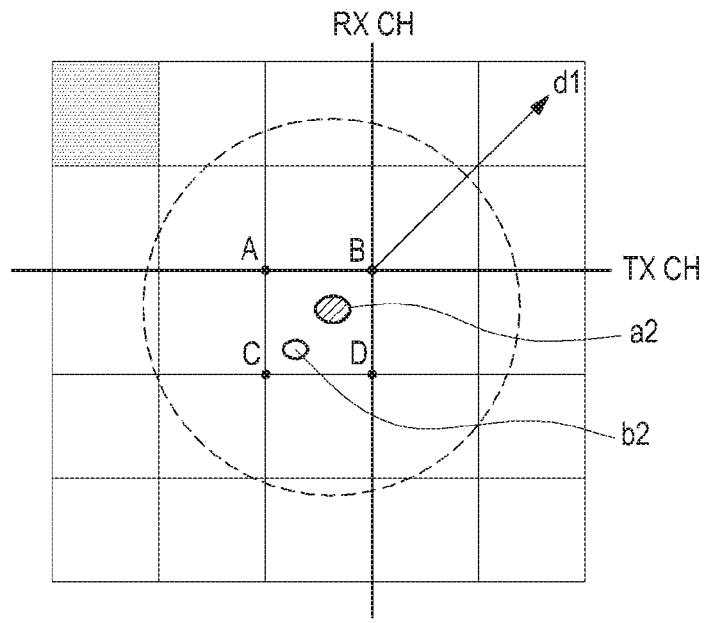
Figure 15B:
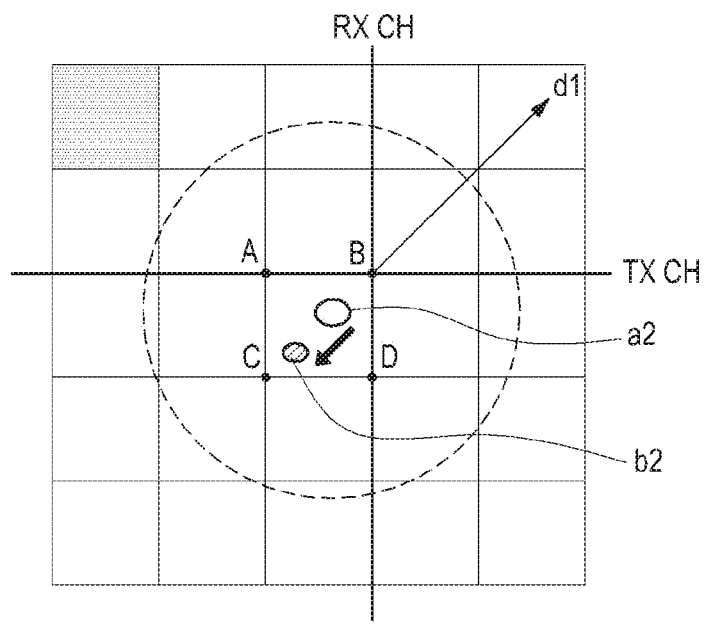

FIGS. 14A to 15B illustrate an operation of calibrating a brush drawing in an electronic device according to various embodiments. When a drawing is executed using a stylus brush, although a center point a1 is an actual start point of the drawing, as illustrated in FIG. 14A, calibration may be performed such that the start point is changed from the center point a1 to an end point b1, as illustrated in FIG. 14B, and thus the drawing starts from the end point b1. Alternatively, when a drawing is executed using a stylus brush, although the drawing starts from a center point a2, as illustrated in FIG. 15A, the travelling direction d1 of the brush may be predicted as illustrated in FIG. 15B, and calibration may be performed such that the drawing is executed to a certain extent in the opposite direction of the travelling direction d1 from the center point a2, for example, from the center point a2 to an end point b2, thus appearing to the user as if the drawing started from the end point b2.

According to various embodiments, the processor 420 may provide various drawing effects using at least one of strength, speed, phase, and the type of the brush (the form of a contact portion of the brush) resulting from the stylus brush that is input to (touches or approaches) the display 410.

According to one embodiment, when a stylus brush touches the display 410, the processor 420 may detect a center point and an end point using coordinates, signal strength, and a size received from the display 410, and may then provide realistic drawing effects based on the movements of the center point and the end point.

Figure 16A:
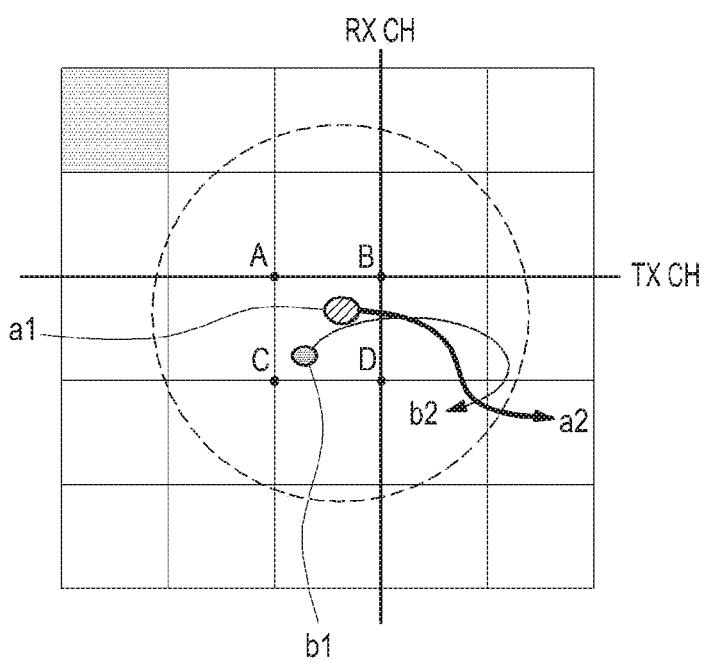
FIGS. 16A and 16B illustrate a drawing effect based on the trajectory change of a center point and an end point of an input device in an electronic device according to various embodiments.
Figure 16B:
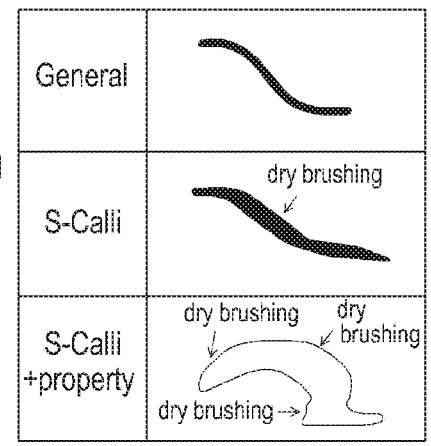

When a touch screen display including a touch panel uses a stylus brush, only drawings effects based on the movement of a center point are currently provided, which are not realistic drawing effects. FIGS. 16A and 16B illustrate a drawing effect based on the trajectory change of a center point and an end point of an input device in an electronic device according to various embodiments. Referring to FIG. 16A, the processor 420 may detect a center point a1 and an end point b1 using coordinates, signal strength and a size received from the display 410, and may provide drawing effects based on the trajectory change a2 of the center point a1 and the trajectory change b2 of the end point b1. When the drawing effects are provided based on the trajectory change a2 of the center point a1 and the trajectory change b2 of the end point b1, as illustrated in FIG. 16A, realistic drawing effects (general, S-calli, and S-Calli+properties) illustrated in FIG. 16B may be provided.

Figure 17A:
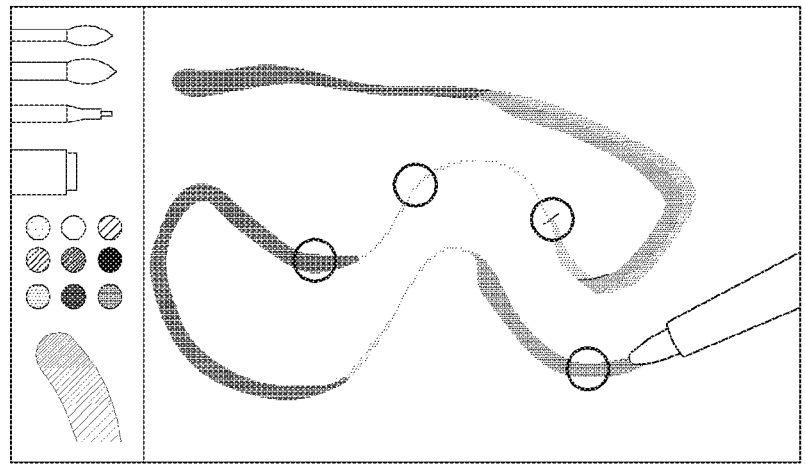
FIGS. 17A and 17B illustrate a drawing effect based on the adjustment of a center point and an end point of an input device in an electronic device according to various embodiments.
Figure 17B:
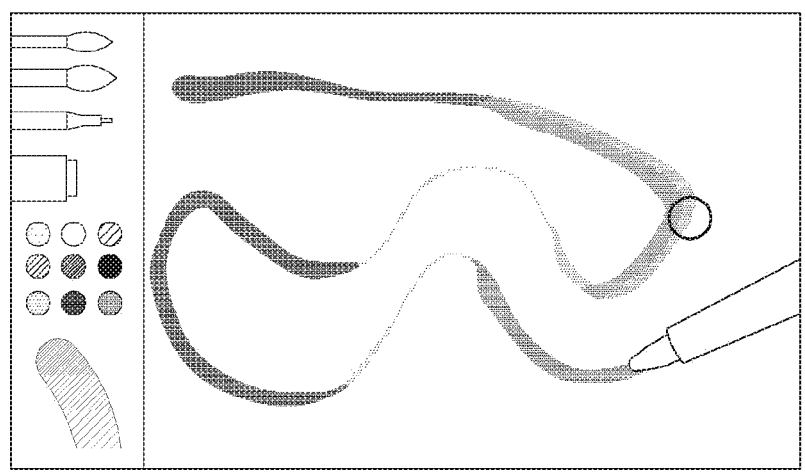

According to one embodiment, when a stylus brush touches the display 410, the processor 420 may detect a center point and an end point using coordinates, signal strength, and a size received from the display 410, and may then provide various drawing effects, for example, gradation, airbrush, and density variation effects, based on a speed difference, a phase difference therebetween, and strength between the center point and the end point. FIGS. 17A and 17B illustrate a drawing effect based on the adjustment of a center point and an end point of an input device in an electronic device according to various embodiments. As illustrated in FIGS. 17A and 17B, while the stylus brush is in contact with the display, various drawing effects may be provided by adjusting the speed difference, the phase difference, and the strength between the center point and the end point.

Figure 18:
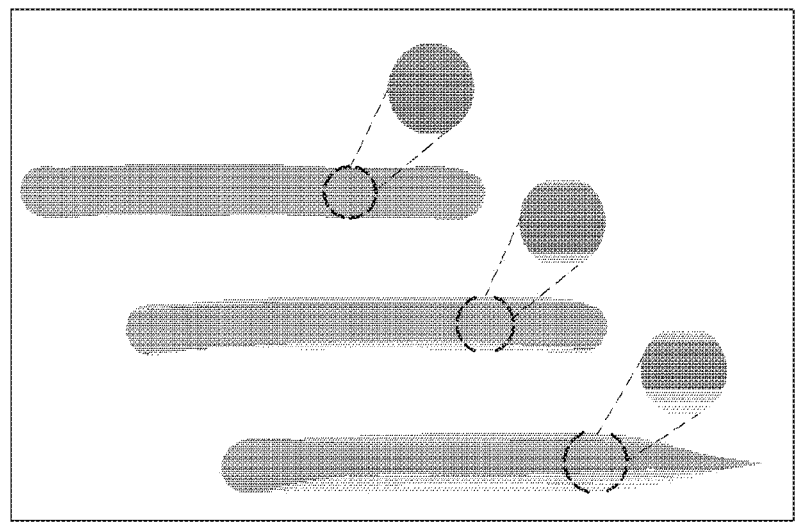
FIG. 18 illustrates a dry brush effect based on the adjustment of a center point and an end point of an input device in an electronic device according to various embodiments.

According to one embodiment, when a stylus brush touches the display 410, the processor 420 may detect a center point and an end point using coordinates, signal strength, and a size received from the display 410, and may then provide various dry brush effects based on a speed difference, a phase difference, and strength between the center point and the end point, for example, a dry brush calligraphy effect when the speed difference is a threshold value or greater and a dry brush drawing effect when the speed difference is less than the threshold value. FIG. 18 illustrates a dry brush effect based on the adjustment of a center point and an end point of an input device in an electronic device according to various embodiments. As illustrated in FIG. 18, while the stylus brush is in contact with the display, various dry brush effects may be provided by adjusting the speed difference, the phase difference, and the strength between the center point and the end point.

According to one embodiment, when a stylus brush touches the display 410, the processor 420 may determine the type of the brush (the form of a contact portion of the brush) based on coordinates, signal strength, and a size received from the display 410. The processor 420 may execute a drawing with a color predefined for the type of the brush, or may apply a drawing effect predefined for the type of the brush.

Figure 19:
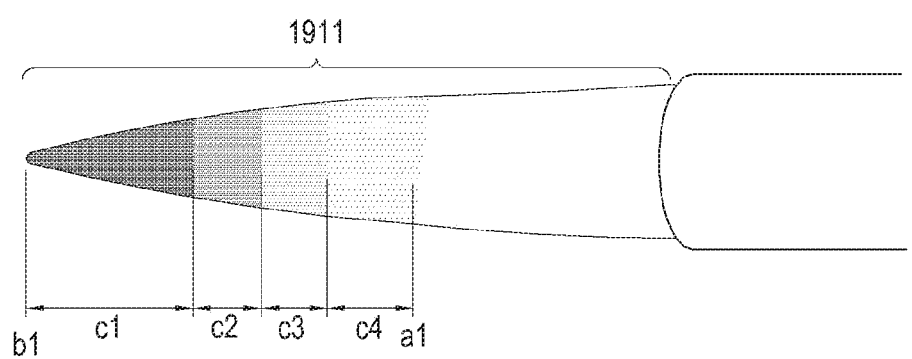
FIG. 19 illustrates a drawing of various colors based on the contact of a contact portion of an input device in an electronic device according to various embodiments.

According to one embodiment, when a stylus brush touches the display 410, the processor 420 may detect a center point and an end point using coordinates, signal strength, and a size received from the display 410, and may then execute a drawing with a plurality of colors predefined for respective intervals from the center point to the end point. FIG. 19 illustrates a drawing of various colors based on the contact of a contact portion of an input device in an electronic device according to various embodiments. Referring to FIG. 19, different colors may be predefined for respective intervals $c_1$ to $c_4$ from an end point $b_1$ to a center point $a_1$ of the contact portion 1911 of the stylus brush. With different colors predefined for respective intervals $c_1$ to $c_4$ from the end point $b_1$ to the center point $a_1$ in the contact portion 1911 of the stylus brush, when the contact portion of the stylus brush touches the display, the effect of drawing on the contact surface with various colors may be provided.

Figure 20:
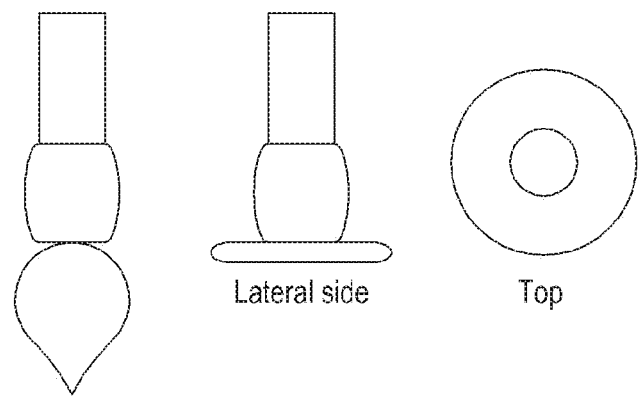
FIG. 20 illustrates a function performed corresponding to the contact form of a stylus brush in an electronic device according to various embodiments.

According to one embodiment, when a stylus brush has a contact form that is different from that of a general drawing, the processor 420 may perform a predefined function. FIG. 20 illustrates a function performed corresponding to the contact form of a stylus brush in an electronic device according to various embodiments. As illustrated in FIG. 20, when the stylus brush is pressed to have a circular contact form, a function corresponding to the circular form, for example, an eraser function, may be activated. When the stylus brush is moved while pressed, the eraser function may be performed to erase a drawing.

Figure 21:
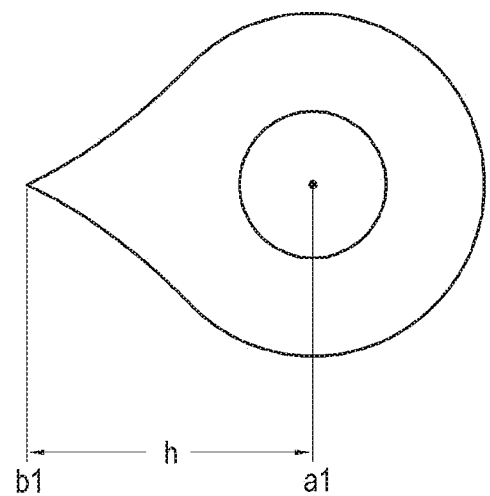
FIG. 21 illustrates a scratch effect using a stylus brush in an electronic device according to various embodiments.

According to one embodiment, when a stylus brush touches the display 410, the processor 420 may detect a center point and an end point using coordinates, signal strength, and a size received from the display 410, and may then provide a scratch effect based on the distance and strength between the center point and the end point. FIG. 21 illustrates a scratch effect using a stylus brush in an electronic device according to various embodiments. As illustrated in FIG. 21, the depth of a scratch may be adjusted according to the distance h and strength between a center point $b_1$ and an end point $a_1$ of the stylus brush, and the width of the scratch effect may be adjusted according to the contact angle of the stylus brush.

According to one embodiment, the processor 420 may implement various drawing effects depending on the attributes of an end portion (tip) of a stylus brush. Various drawing effects may be implemented depending on the strength of the end portion (tip) of the stylus brush, for example, when the end portion (tip) of the stylus brush holds a large amount of water or when the end portion (tip) of the stylus brush easily evaporates water. The processor 420 may implement a predefined drawing effect depending on at least one of the speed, time difference, length, and attributes of the end portion (tip) of the stylus brush.

Figure 22A:
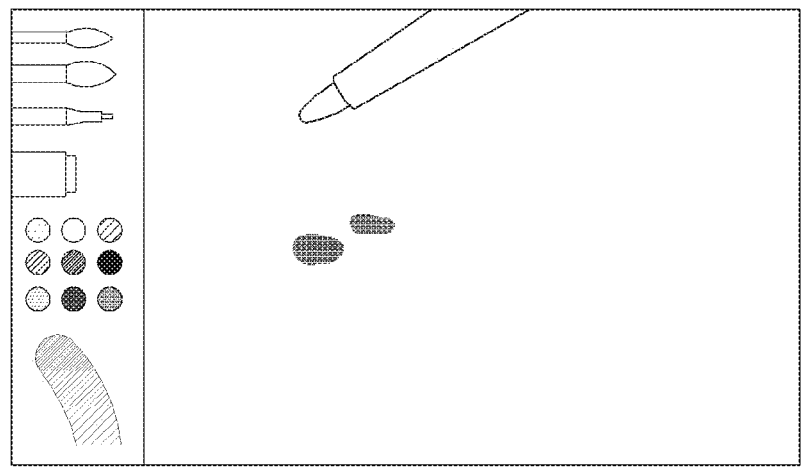
FIGS. 22A and 22B illustrate a drawing effect according to hovering of an input device in an electronic device according to various embodiments.
Figure 22B:
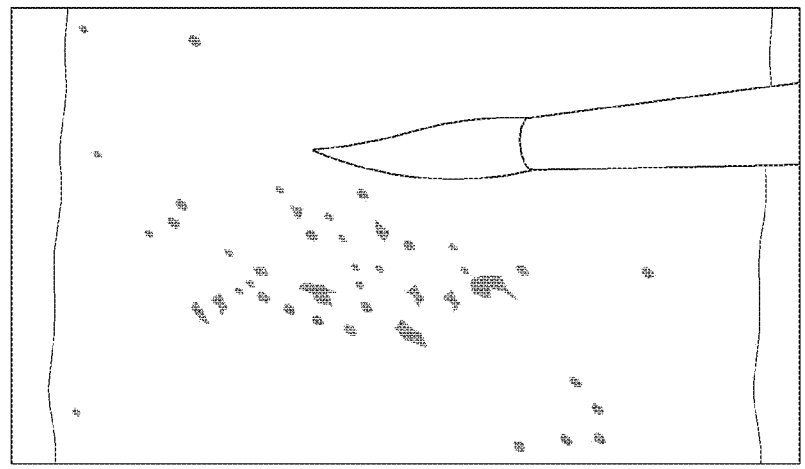

According to various embodiments, the processor 420 may provide various drawing effects using proximity input with a stylus brush. When a touch sensor provided in the display 410 or a sensor of the electronic device receives hovering of the brush or distinguishes hovering from contact using a specified threshold value, the processor may provide various drawing effects according to hovering of the brush. FIGS. 22A and 22B illustrate a drawing effect according to hovering of an input device in an electronic device according to various embodiments. As illustrated in FIG. 22A, when hovering of a stylus brush is recognized and the brush remains stationary at the same position for a certain period of time or longer, the processor 420 may provide a water-dripping drawing effect. The water-dripping drawing effect may provide various water drop-spreading effects according to the height of the hovering brush, the type and properties of the brush. As illustrated in FIG. 22B, when hovering of a stylus brush is recognized and then the position, height, or angle of the brush sharply changes (for example, a brush-shaking motion is made), the processor 420 may provide a water-spraying drawing effect. The water-spraying drawing effect may provide a wider water-spraying drawing effect as the brush has a greater positional change and a greater height, and a water-spraying direction may be determined depending on the angle of the brush.

According to various embodiments, the processor 420 may provide various forms of drawing effects depending on at least one of the speed, time difference, length, and attributes of the end portion (tip) of the stylus brush. The processor 420 may store frequently used drawing patterns and may prioritize the stored drawing patterns according to the frequency of use. For example, when curves are frequently drawn by a user, dry brushing for curve drawing may be preferentially set and applied.

According to various embodiments, the processor 420 may distinguish a portion that the brush touches from a portion where hovering of the brush is detected by combining a change in a state of hovering resulting from the proximity of the stylus brush to the display 410 and a touch signal resulting from the touch of the stylus brush, thereby providing a more detailed drawing effect for the portion that the brush touches.

According to various embodiments, the processor 420 may perform a function designated based on the type of a gesture occurring by touch input, rather than input using the stylus brush. Alternatively, the processor 420 may perform a function designated based on the shape, size, and strength of an area generated by touch input, rather than input using the brush, for example, screen zoom-in/zoom-out or attributes (color, thickness, type, or the like) of the brush.

Figure 23:
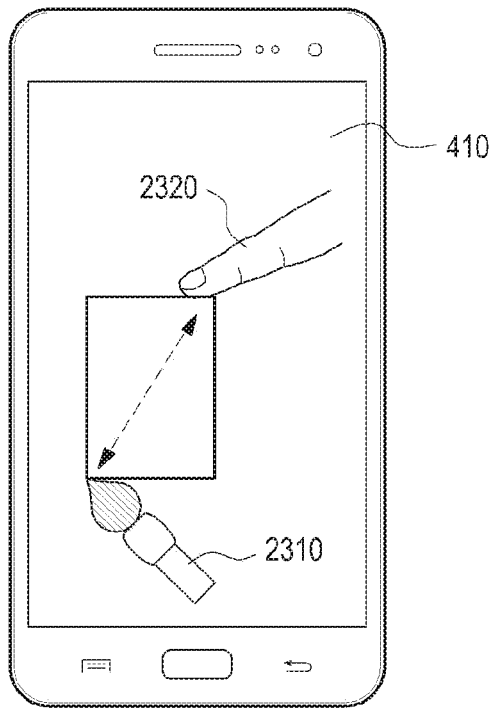
FIG. 23 illustrates an operation of performing a zoom-in/zoom-out function using input with a stylus brush in an electronic device according to various embodiments.

FIG. 23 illustrates an operation of performing a zoom-in/zoom-out function using input with a stylus brush in an electronic device according to various embodiments. As illustrated in FIG. 23, when a gesture of upward diagonal input with the user's finger 2320 is generated with input using the stylus brush 2310 entered onto the display 410, the processor 420 may perform a screen zoom-in function. Further, when a gesture of downward diagonal input with the user's finger 2320 is generated with input using the stylus brush 2310 entered onto the display 410, the processor 420 may perform a screen zoom-out function.

Figure 24:
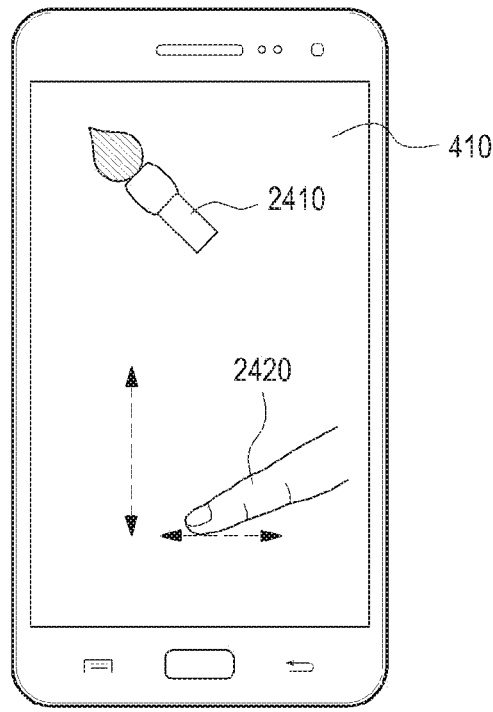
FIG. 24 illustrates an operation of providing a function of changing the attribute of a stylus brush using input with the stylus brush in an electronic device according to various embodiments.

FIG. 24 illustrates an operation of providing a function of changing the attribute of a stylus brush using input with the stylus brush in an electronic device according to various embodiments. As illustrated in FIG. 24, when a gesture of up-to-down input or down-to-up input with the user's finger 2420 is generated with input using the stylus brush 2410, the processor 420 may adjust the thickness of the brush corresponding to the traveling distance of the user's finger 2420. Further, when a gesture of left-to-right input or right-to-left input with the user's finger 2420 is generated with input using the stylus brush 2410, the processor 420 may change the color of the brush corresponding to the traveling distance of the user's finger 2420.

Figure 25:
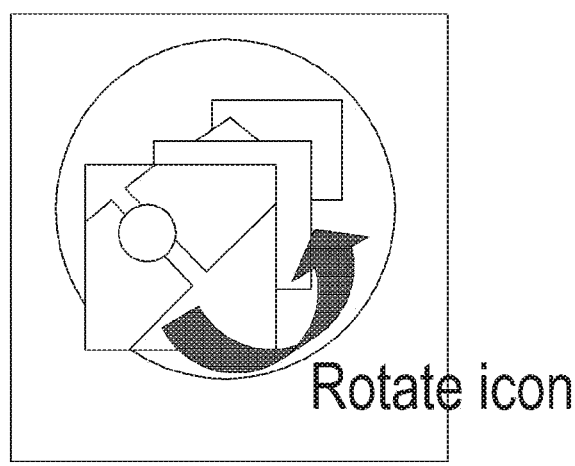
FIG. 25 illustrates an operation of performing a particular function using a stylus brush in an electronic device according to various embodiments.

According to various embodiments, the processor 420 may switch to a function implementation mode based on the attributes of a stylus brush, such as strength based on input and the distance between the center point and the end point. The processor 420 may provide different operations depending on the attributes of the brush in the function implementation mode. For example, when the strength of the brush is low and the distance between the center point and the end point is a certain length or less, which is defined as the function implementation mode, the processor 420 may provide an operation different from general brush input. FIG. 25 illustrates an operation of performing a particular function using a stylus brush in an electronic device according to various embodiments. As illustrated in FIG. 25, when a plurality of icons respectively corresponding to a plurality of applications exists in a particular folder in the function implementation mode switched according to the attributes of input with the stylus brush, the plurality of icons may be rotated by the input with the brush, for example, drawing input in a particular direction, thereby identifying the types of the icons provided in the folder. Further, when a particular icon is selected by the brush among the plurality of icons, an application corresponding to the selected icon may be executed.

Figures 26A, 26B:
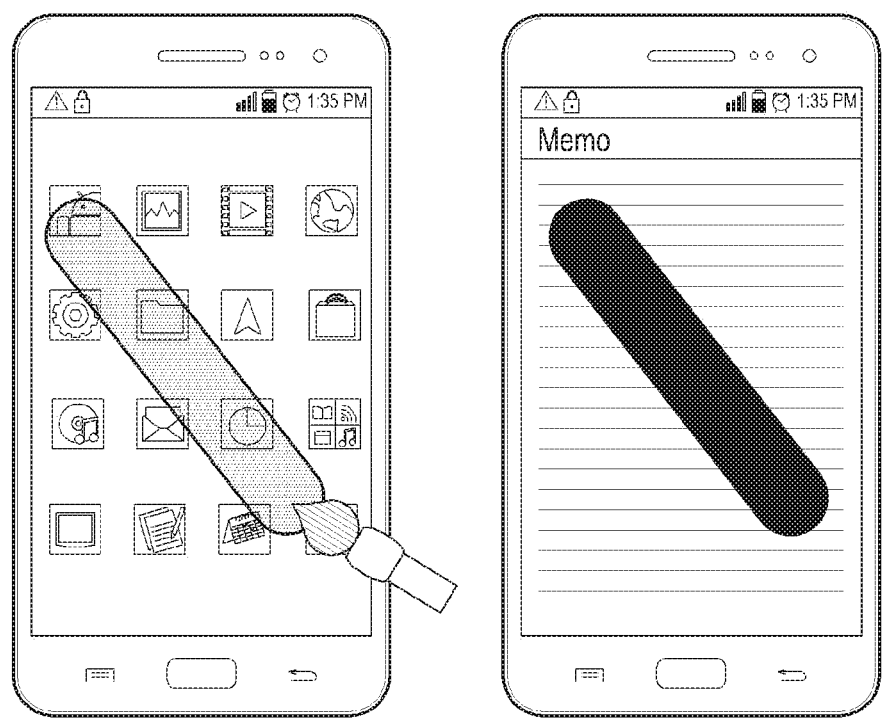
FIGS. 26A and 26B illustrate an application execution operation using a stylus brush in an electronic device according to various embodiments.

According to various embodiments, when input with the brush is detected using the shape, size, and strength of an area where the input with the stylus brush is entered, the processor 420 may execute a drawing application, and the drawing application may reflect the content of drawing based on input using the brush. For example, when the user performs input to the display 410 using the stylus brush during the execution of a particular application, the processor 420 may make content input using the brush into a background in an LCD buffer and may immediately execute the drawing application, thus reflecting and displaying the content of the drawing input using the brush. FIGS. 26A and 26B illustrate an application execution operation using a stylus brush in an electronic device according to various embodiments. When input with the stylus brush is recognized while a home screen including a plurality of icons is displayed, as illustrated in FIG. 26A, a memo application is automatically executed, as shown in FIG. 26B, and a drawing corresponding to the input with the brush entered onto the home screen may be reflected and displayed as it is on a screen displaying the executed memo application.

Figures 27A, 27B:
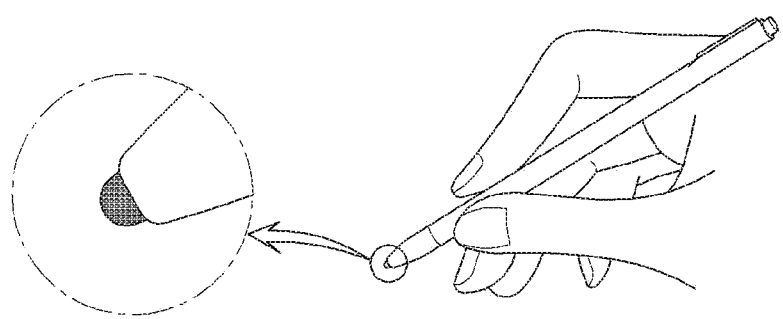
FIGS. 27A and 27B illustrate an operation of providing a drawing effect of a stylus brush using input with a stylus pen in an electronic device according to various embodiments.

According to various embodiments, the processor 420 may provide the same drawing effect as that of a stylus brush using input with a stylus pen. When input is performed using a general stylus pen, the processor 420 may provide the same effect as that of a stylus brush depending on the material and form of the stylus pen. FIGS. 27A and 27B illustrate an operation of providing a drawing effect of a stylus brush using input with a stylus pen in an electronic device according to various embodiments. As illustrated in FIG. 27A, when an end portion (tip) of a contact portion of the stylus pen is a hard type, the contact curvature of the pen changes depending on the input angle of the pen, making it possible to predict the travelling direction of the pen. When the strength and the acceleration of the pen are measured using the touch panel of the display 410 according to the input with the pen, the processor 420 may provide the same drawing effect as that of the stylus brush between the start position of the pen and the position to which the same is moved. As illustrated in FIG. 27B, when the end portion (tip) of the contact portion of the stylus pen is made of an elastic material, the form of the elastic body may change depending on the input angle and the input strength of the pen to corresponding to input with the stylus brush. Output corresponding to the stylus brush may be displayed on the screen using the measured angle, strength, and contact size corresponding to the input with the pen.

Figures 28A, 28B:
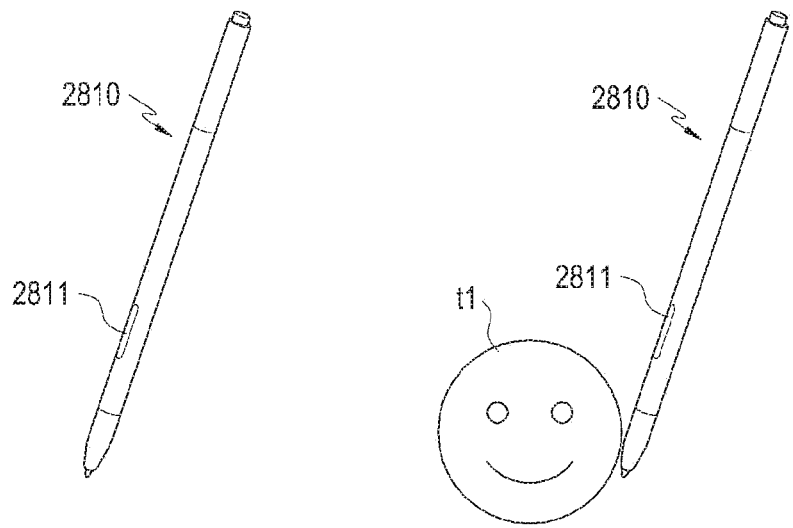
FIGS. 28A to 28C illustrate an operation of performing a particular function using a button of a stylus pen in an electronic device according to various embodiments.
Figure 28C:
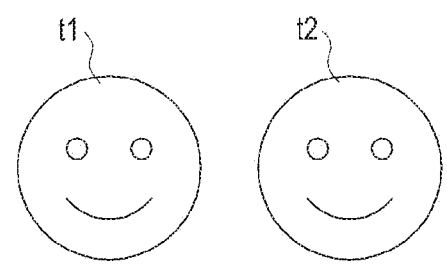

According to various embodiments, the processor 420 may change the output attributes of a stylus brush or a stylus pen using buttons provided on the stylus brush or stylus pen. For example, the processor 420 may provide an attribute change, such as a mode change, a color change, and an eraser function, through input via a button provided on the stylus brush or the stylus pen. FIGS. 28A to 28C illustrate an operation of performing a particular function using a button of a stylus pen in an electronic device according to various embodiments. The processor 420 may start recording when the button 2811 provided in the stylus pen 2810 is pressed as illustrated in FIG. 28A; may terminate recording when an object t1 drawn with the pen 2810 is output and the button 2811 of the stylus pen 2810 is pressed again as illustrated in FIG. 28B; and may automatically generate and display the same object t2 as the drawn object t1 as illustrated in FIG. 28C.

According to various embodiments, the memory 430 may be the memory 130 illustrated in FIG. 1. According to one embodiment, the memory 430 may store the type of input device and signal strength and a size corresponding to the type of the input device in a corresponding manner. According to one embodiment, the memory 430 may store instructions for the processor 420 to perform operations according to various embodiments of the present disclosure.

According to various embodiments, when a stylus brush touches the display 410, the processor 420 may detect a center point or an end point based on coordinates, signal strength, and a size received from the display 410, and may select an object based on the position of one of the center point and the end point.

According to one embodiment, when both the center point and the end point are located within an area of the object, the processor 420 may select the object and may perform a function corresponding to the selected object.

According to one embodiment, when only the endpoint is detected based on the coordinates, the signal strength, and the size received from the display 410 and the endpoint is located in at least a portion of the area of the object, the processor 420 may select the object and may perform a function corresponding to the selected object.

According to one embodiment, when the endpoint is located within the area of the object and the center point is located in the at least a portion of the area of the object, the processor 420 may select the object and may perform a function corresponding to the selected object.

According to one embodiment, when the endpoint is located within the area of the object and the center point is located outside the area of the object, the processor 420 may select the object and may perform a function corresponding to the selected object.

According to various embodiments, a touch screen display 410 may include a touch panel, a processor 420 may be electrically connected to the display, and a memory 430 may be electrically connected to the processor. The memory 430 may be configured to store instructions that, when executed, enable the processor 420 to: receive, from the touch panel, data about touch or proximity of an external object on or to the touch screen display; select one of a first routine, a second routine, and a third routine at least partially on the basis of the data; process the data using the selected one routine; and display an image or a change in an image on the display based on the processed data.

According to various embodiments, the instructions may be configured to enable the processor 420 to: select the first routine when the external object is a stylus pen; select the second routine when the external object is a body part of a user; and select the third routine when the external object is a stylus brush.

According to various embodiments, the instructions may be configured to enable the processor 420 to determine the type of the brush on the basis of the data when the third routine is selected.

According to various embodiments, the instructions may be configured to enable the processor 420 to display an image or a change in an image on the display at least partially on the basis of the determined type of the brush.

According to various embodiments, the instructions may be configured to enable the processor 420 to display an effect corresponding to the type of the brush on the display at least partially on the basis of the data after the first routine or the second routine is selected.

According to various embodiments, the data about the touch or proximity may include at least one of coordinates, a size, and a signal strength detected due to the touch or proximity relative to the touch panel.

According to various embodiments, the instructions may be configured to enable the processor 420 to select one of the first routine, the second routine, and the third routine at least partially on the basis of the level of the signal strength.

According to various embodiments, the instructions may be configured to enable the processor 420 to: select the first routine when the level of the signal strength is less than or equal to a first threshold value; select the second routine when the level of the signal strength is greater than or equal to a second threshold value, which is greater than the first threshold value; and select the third routine when the level of the signal strength is between the first threshold value and the second threshold value.

According to various embodiments, the instructions may be configured to enable the processor 420 to determine the type of the brush at least partially on the basis of the detected size after the third routine is selected.

According to various embodiments, the instructions may be configured to enable the processor 420 to: determine an area detected due to the touch or proximity relative to the touch panel at least partially on the basis of the data; determine a first sub-area having relatively high signal strength in the area; and display an image or a change in an image on the display on the basis of the position and/or size of the determined sub-area.

According to various embodiments, a touch screen display 410 may include a touch panel, a processor 420 may be electrically connected to the display 410, and a memory 430 may be electrically connected to the processor 420. The memory 430 may be configured to store instructions that, when executed, enable the processor 420 to: receive, from the touch panel, data about touch or proximity of an external object on or to the touch screen display; determine an area detected due to the touch or proximity relative to the touch panel at least partially on the basis of the data; determine at least a portion having relatively high signal strength in the area; determine at least another portion having relatively low signal strength in the area; and display an image or a change in an image on the display on the basis of positions and/or sizes of the determined areas.

According to various embodiments, the instructions may be configured to enable the processor 420 to determine that the external object is a stylus brush on the basis of the data about the touch or proximity or the positions and/or sizes of the determined areas.

According to various embodiments, the data about the touch or proximity may include at least one of a coordinate, a size, and signal strength detected due to the touch or proximity relative to the touch panel.

According to various embodiments, the instructions may be configured to enable the processor 420 to determine at least one of the type of the brush and the drawing direction of the brush on the basis of the positions and/or sizes of the determined areas.

According to various embodiments, the instructions may be configured to enable the processor 420 to display an image or a change in an image on the display at least partially on the basis of the determined type of the brush and the determined drawing direction of the brush.

According to various embodiments, the instructions may be configured to enable the processor 420 to execute a drawing with different colors at least partially on the basis of the determined type of the brush and the determined drawing direction of the brush.

According to various embodiments, the instructions may be configured to enable the processor 420 to display a start of a drawing from the at least another portion at least partially on the basis of the determined type of the brush and the determined drawing direction of the brush.

According to various embodiments, the instructions may be configured to enable the processor 420 to display different drawing effects on the display using at least one of a speed difference, a phase difference, and a signal strength difference between the determined areas.

According to various embodiments, the instructions may be configured to enable the processor 420 to display different drawing effects on the display on the basis of the proximity distance between the brush and the touch screen display.

According to various embodiments, a touch screen display 410 may include a touch panel, a processor 420 may be electrically connected to the display 410, and a memory 430 may be electrically connected to the processor 420. The memory 430 may be configured to store instructions that, when executed, enable the processor 420 to: receive, from the touch panel, data about touch or proximity of an external object on or to the touch screen display; determine an area detected due to the touch or proximity relative to the touch panel at least partially on the basis of the data; determine at least a portion having relatively high signal strength in the area; determine at least another portion having relatively low signal strength in the area; and select an object on the basis of the position of any one of the at least a portion and the at least another portion.

According to various embodiments, the instructions may be configured to enable the processor 420 to select the object on the basis of the position of the at least another portion when the at least a portion is not determined.

According to various embodiments, the instructions may be configured to enable the processor 420 to perform a function corresponding to the object when the at least another portion is located in the area of the object and the at least a portion is located outside the area of the object or in at least a portion of the area of the object.

Figure 29:
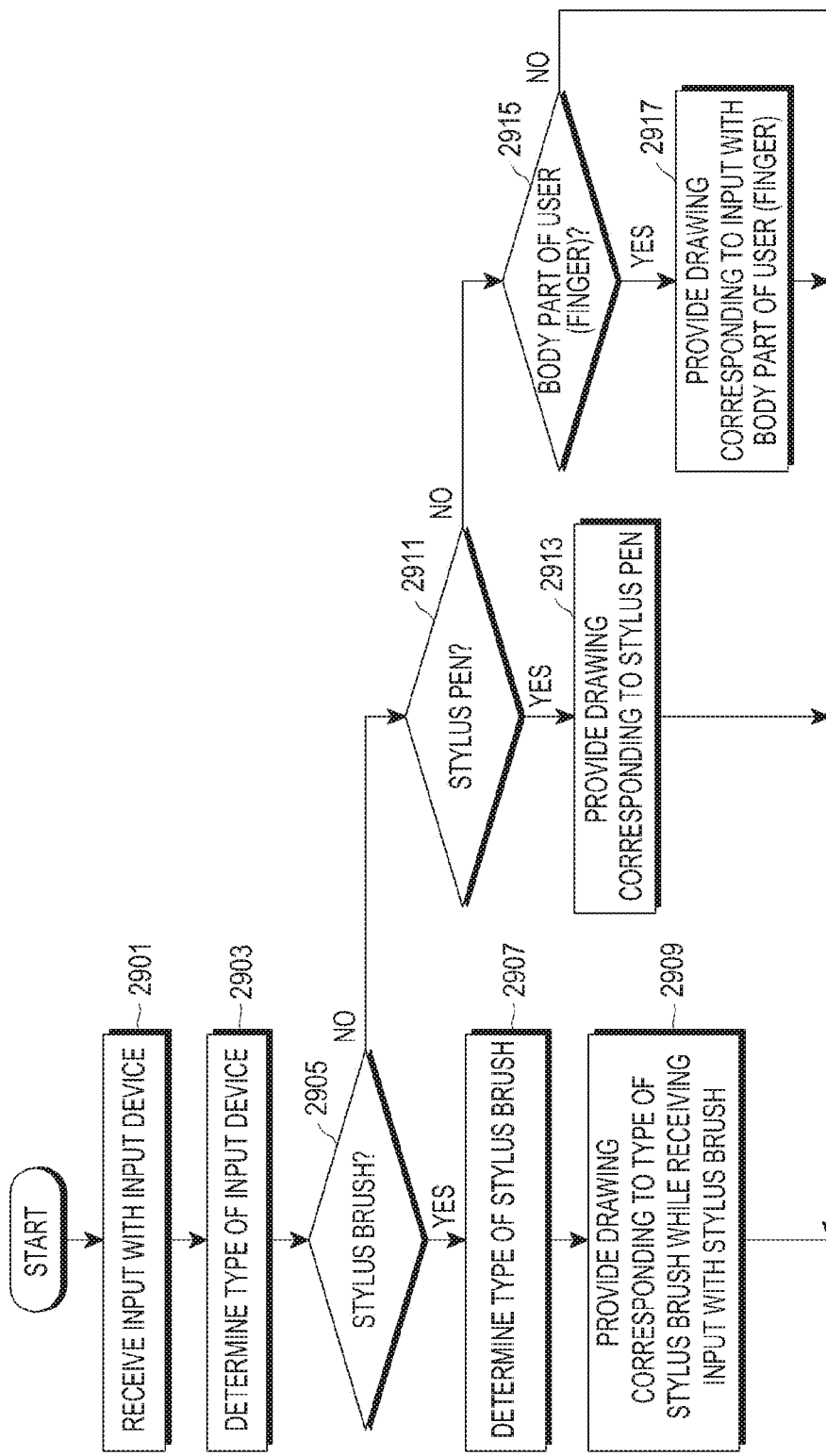
FIG. 29 is a flowchart illustrating an input method of an electronic device according to various embodiments.

FIG. 29 is a flowchart illustrating an input method of an electronic device according to various embodiments. FIG. 29 illustrates an example in which the processor 420 of the electronic device 401 of FIG. 4 performs the input method 2900 of the electronic device according to various embodiments. Referring to FIG. 29, in operation 2901, when an input device, which is an external object, is used to perform input onto (touches or approaches) the display 410, the processor 420 may receive input via the input device based on data (for example, coordinates, signal strength, and size) about the input with the input device received from the display 410.

In operation 2903, the processor 420 may determine the type of the input device based on the data (for example, coordinates, signal strength, and size) received from the display 410.

In operation 2905, the processor 420 may determine that the input device is a stylus brush based on the data (for example, coordinates, signal strength, and size) received from the display 410.

In operation 2907, the processor 420 may determine the type of the stylus brush (the form of a contact portion of the stylus brush) based on the data (for example, coordinates, signal strength, and size) received from the display 410. In operation 2909, the processor 420 may provide a drawing corresponding to the type of the stylus brush and may display an image or a change in an image on the display 410 while receiving the input with the stylus brush.

In operation 2911, the processor 420 may determine that the input device is a stylus pen based on the data (for example, coordinates, signal strength, and size) received from the display 410.

In operation 2913, the processor 420 may provide a drawing corresponding to the stylus pen and may display an image or a change in an image on the display 410 while receiving the input with the stylus pen.

In operation 2915, the processor 420 may determine that the input device is a body part of a user, for example, a finger, based on the data (for example, coordinates, signal strength, and size) received from the display 410.

In operation 2917, the processor 420 may provide a drawing corresponding to the finger of the user, and may display an image or a change in an image on the display 410 while receiving the input made with the finger of the user.

According to various embodiments, an input method of an electronic device may include: receiving, from a touch panel, data about touch or proximity of an external object on or to a touch screen display; selecting one of a first routine, a second routine, and a third routine at least partially on the basis of the data; processing the data using the selected one routine; and displaying an image or a change in an image on the display on the basis of the processed data.

According to various embodiments, the selecting may include: selecting the first routine when the external object is a stylus pen; selecting the second routine when the external object is a body part of a user; and selecting the third routine when the external object is a stylus brush.

According to various embodiments, the method may further include determining the type of the brush on the basis of the data when the third routine is selected.

According to various embodiments, the method may further include displaying an image or a change in an image on the display at least partially on the basis of the determined type of the brush.

According to various embodiments, the method may further include displaying an effect corresponding to the type of the brush on the display at least partially on the basis of the data after the first routine or the second routine is selected.

According to various embodiments, the data about the touch or proximity may include at least one of coordinates, a size, and a signal strength detected due to the touch or proximity relative to the touch panel.

According to various embodiments, the method may further include selecting one of the first routine, the second routine, and the third routine at least partially on the basis of the level of the signal strength.

According to various embodiments, the selecting of one of the first routine, the second routine, and the third routine may include: selecting the first routine when the level of the signal strength is less than or equal to a first threshold value; selecting the second routine when the level of the signal strength is greater than or equal to a second threshold value, which is greater than the first threshold value; and selecting the third routine when the level of the signal strength is between the first threshold value and the second threshold value.

According to various embodiments, the method may further include determining the type of the brush at least partially on the basis of the detected size after the third routine is selected.

According to various embodiments, the method may further include: determining an area detected due to the touch or proximity relative to the touch panel at least partially on the basis of the data; determining a first sub-area having relatively high signal strength in the area; and displaying an image or a change in an image on the display on the basis of the position and/or size of the determined sub-area.

According to various embodiments, an input method of an electronic device may include: receiving, by an electronic device, data about touch or proximity of an external object on or to a touch screen display from the touch panel; determining an area detected due to the touch or proximity relative to the touch panel at least partially on the basis of the data; determining at least a portion having relatively high signal strength in the area; determining at least another portion having relatively low signal strength in the area; and displaying an image or a change in an image on the display on the basis of positions and/or sizes of the determined areas.

According to various embodiments, the method may further include determining that the external object is a stylus brush on the basis of the data about the touch or proximity or the positions and/or sizes of the determined areas.

According to various embodiments, the data about the touch or proximity may include at least one of coordinates, a size, and a signal strength detected due to the touch or proximity relative to the touch panel.

According to various embodiments, the method may further include determining at least one of the type of the brush and the drawing direction of the brush on the basis of the positions and/or sizes of the determined areas.

According to various embodiments, the method may further include displaying an image or a change in an image on the display at least partially on the basis of the determined type of the brush and the determined drawing direction of the brush.

According to various embodiments, the method may further include executing a drawing with different colors at least partially on the basis of the determined type of the brush and the determined drawing direction of the brush.

According to various embodiments, the method may further including a calibration operation of displaying a start of a drawing from the at least another portion at least partially on the basis of the determined type of the brush and the determined drawing direction of the brush.

According to various embodiments, the method may further include displaying different drawing effects on the display using at least one of a speed difference, a phase difference, and a signal strength difference between the determined areas.

According to various embodiments, the method may further include displaying different drawing effects on the display on the basis of the proximity distance between the brush and the touch screen display.

The invention claimed is:

1. An electronic device comprising:
   a touch screen display configured to comprise a touch panel;
   a processor configured to be electrically connected to the display; and
   a memory configured to be electrically connected to the processor,
   wherein the memory is configured to store instructions that, when executed, enable the processor to:
   receive, from the touch panel, data about a single touch or a single proximity of a stylus brush or to the touch screen display;
   identify a first area related to the single touch or the single proximity of the stylus brush relative to the touch panel based at least partially on the data;
   identify a first sub-area corresponding to a relatively high signal strength in the first area;
   identify a second sub-area corresponding to a relatively low signal strength in the first area; and
   display at least one image or a change in an image on the display based on positions and/or sizes of the first sub-area and the second sub-area.

2. The electronic device of claim 1, wherein the instructions are further configured to enable the processor to: display different drawing effects on the display based on a proximity distance between the stylus brush and the touch screen display,
   wherein the data about the single touch or the single proximity comprises at least one of coordinates, a size, and a signal strength detected due to the single touch or the single proximity of stylus brush relative to the touch panel.

3. The electronic device of claim 1, wherein the instructions are configured to enable the processor to identify at least one of a type of the stylus brush and a drawing direction of the stylus brush based on the positions and/or sizes of the first sub-area and the second sub-area.

4. The electronic device of claim 3, wherein the instructions are configured to enable the processor to display the at least one image or a change in an image on the display based at least partially on the identified type of the stylus brush and the identified drawing direction of the stylus brush.

5. The electronic device of claim 3, wherein the instructions are configured to enable the processor to execute a drawing with different colors based at least partially on the identified type of the brush and the identified drawing direction of the stylus brush.

6. The electronic device of claim 3, wherein the instructions are configured to enable the processor to display a start of a drawing from the second sub-area based at least partially on the identified type of the stylus brush and the identified drawing direction of the stylus brush.

7. The electronic device of claim 1, wherein the instructions are configured to enable the processor to display different drawing effects on the display using at least one of a speed difference, a phase difference, and a signal strength difference between the first sub-area and the second sub-area.

8. An input method of an electronic device, the method comprising:
   receiving, by an electronic device, data about a single touch or a single proximity of an stylus brush on or to a touch screen display from a touch panel of the display;
   identifying a first area related to the single touch or the single proximity of the stylus brush relative to the touch panel based at least partially on the data;
   identifying a first sub-area corresponding to a relatively high signal strength in the first area;
   identifying a second sub-area corresponding to a relatively low signal strength in the first area; and
   displaying at least one image or a change in an image on the display based on positions and/or sizes of the first sub-area and the second sub-area.

9. The method of claim 8, further comprising:
   displaying different drawing effects on the display using at least one of a speed difference, a phase difference, and a signal strength difference between the first sub-area and the second sub-area,
   wherein the data about the touch or proximity comprises at least one of coordinates, a size, and a signal strength detected due to the single touch or the single proximity of the stylus brush relative to the touch panel.

10. The method of claim 8, further comprising:
    identifying at least one of a type of the stylus brush and a drawing direction of the stylus brush based on the positions and/or sizes of the first sub-area and the second sub-area.

11. The method of claim 10, further comprising:
    displaying the at least one image or the change in an image on the display based at least partially on the identified type of the stylus brush and the identified drawing direction of the stylus brush.

12. The method of claim 10, further comprising:
executing a drawing with different colors based at least partially on the identified type of the stylus brush and the identified drawing direction of the stylus brush.

13. The method of claim 10, further comprising:
displaying a start of a drawing from the second sub-area based at least partially on the identified type of the stylus brush and the identified drawing direction of the stylus brush.

14. An electronic device comprising:
a touch screen display configured to comprise a touch panel;
a processor configured to be electrically connected to the display; and
a memory configured to be electrically connected to the processor,
wherein the memory is configured to store instructions that, when executed, enable the processor to:

receive, from the touch panel, data about a single touch or a single proximity of a stylus brush on or to the touch screen display;
identify a first area related to the single touch or the single proximity of the stylus brush relative to the touch panel based at least partially on the data;
identify a first sub-area corresponding to a relatively high signal strength in the first area;
identify a second sub-area corresponding to a relatively low signal strength in the first area; and
select an object based on a position of any one of the first sub-area and the second sub-area.

15. The electronic device of claim 14, wherein the instructions are configured to enable the processor to:
perform a function corresponding to the object when the second sub-area is located in an area of the object and the first sub-area is located outside the area of the object or in at least a portion of the area of the object.

\* \* \* \* \*